United States Patent
Li et al.

(10) Patent No.: US 9,872,314 B2
(45) Date of Patent: Jan. 16, 2018

(54) METHOD AND DEVICE FOR ACCESSING CHANNEL

(71) Applicant: Huawei Technologies Co., Ltd., Shenzhen (CN)

(72) Inventors: Bo Li, Shenzhen (CN); Qiao Qu, Shenzhen (CN); Yunbo Li, Shenzhen (CN); Tianyu Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 168 days.

(21) Appl. No.: 15/010,576

(22) Filed: Jan. 29, 2016

(65) Prior Publication Data

US 2016/0150565 A1 May 26, 2016

Related U.S. Application Data

(63) Continuation of application No. PCT/CN2014/072960, filed on Mar. 6, 2014.

(30) Foreign Application Priority Data

Jul. 31, 2013 (CN) .......................... 2013 1 0328459

(51) Int. Cl.
- H04L 1/00 (2006.01)
- H04W 74/08 (2009.01)
- H04L 5/00 (2006.01)

(52) U.S. Cl.
CPC ............ H04W 74/08 (2013.01); H04L 5/003 (2013.01); H04L 5/006 (2013.01); H04L 5/0037 (2013.01)

(58) Field of Classification Search
CPC ......... H04L 47/10; H04L 47/12; H04L 47/20; H04L 47/24; H04L 47/32; H04L 47/38;
(Continued)

(56) References Cited

U.S. PATENT DOCUMENTS

| 8,422,449 B2 | 4/2013 | Choi |
| 9,066,334 B2 * | 6/2015 | Kim .................. H04W 72/0406 |

(Continued)

FOREIGN PATENT DOCUMENTS

| CN | 1805316 A | 7/2006 |
| WO | WO 2009029015 A1 | 3/2009 |

OTHER PUBLICATIONS

Jiao et al., "Competitive scheduling for OFDMA systems with guaranteed transmission rate," Computer Communications, vol. 32, Issue 3, pp. 501-510 (2009).
(Continued)

*Primary Examiner* — Dady Chery
(74) *Attorney, Agent, or Firm* — Leydig, Voit & Mayer, Ltd.

(57) ABSTRACT

Embodiments of the present invention provide a method and a device for accessing a channel. The method includes: receiving a contention request frame transmitted by a first transmitting end device on M sub-carriers, where the M sub-carriers at least have two inconsecutive sub-carriers, and the contention request frame is modulated onto the M sub-carriers; according to the contention request frame, acquiring channel state information about the first transmitting end device respectively on the M sub-carriers, and determining channel state information about the first transmitting end device respectively on N sub-carriers, where the N sub-carriers are obtained by dividing all or a part of a system available frequency band, the N sub-carriers include the M sub-carriers, both N and M are positive integers, N>M and M>1; and performing allocation of a transmission sub-channel according to the channel state information about the first transmitting end device respectively on the N sub-carriers.

20 Claims, 12 Drawing Sheets

(58) Field of Classification Search
CPC ......... H04L 47/70; H04L 47/72; H04L 47/74; H04L 47/78; H04L 47/80; H04W 28/02; H04W 28/0205; H04W 28/021; H04W 28/0247; H04W 28/0252
USPC ........ 370/329, 339, 341, 229, 230, 235, 252
See application file for complete search history.

(56) References Cited

U.S. PATENT DOCUMENTS

| | | | |
|---|---|---|---|
| 9,647,738 B2* | 5/2017 | Kim | H04B 7/0417 |
| 2008/0013496 A1* | 1/2008 | Dalmases | H04W 72/0446 370/336 |
| 2009/0110087 A1 | 4/2009 | Liu et al. | |
| 2013/0286933 A1* | 10/2013 | Lee | H04L 1/0026 370/315 |
| 2014/0010196 A1* | 1/2014 | Shapira | H04B 7/2681 370/329 |
| 2015/0341878 A1* | 11/2015 | Lee | H04W 56/004 370/329 |

OTHER PUBLICATIONS

Hottinen et al., "Subcarrier Allocation in a Multiuser MIMO Channel Using Linear Programming," 14$^{th}$ European Signal Processing Conference (EUSIPCO 2006), Florence, Italy (Sep. 2-8, 2006).

* cited by examiner

METHOD AND DEVICE FOR ACCESSING CHANNEL

CROSS-REFERENCE TO RELATED APPLICATIONS

This application is a continuation of International Application No. PCT/CN2014/072960, filed on Mar. 6, 2014, which claims priority to Chinese Patent Application No. 201310328459.X, filed on Jul. 31, 2013, both of which are hereby incorporated by reference in their entireties.

TECHNICAL FIELD

Embodiments of the present invention relate to the field of communications technologies and, in particular, to a method and a device for accessing a channel.

BACKGROUND

An orthogonal frequency division multiple access (Orthogonal Frequency Division Multiple Access, OFDMA) technology is a commonly used access technology in the field of modern communications, and a foundation thereof is an orthogonal frequency division multiplexing (Orthogonal Frequency Division Multiplexing, OFDM) technology. In the OFDM technology, a channel is divided into several orthogonal sub-carriers, and a high-speed data signal is converted into parallel low-speed sub data flows, which are modulated onto the sub-carriers for transmission. If the OFDM technology is used, when a plurality of transmitting end devices transmit data to a receiving end device simultaneously, a collision will occur. While in the OFDMA technology, if several consecutive sub-carriers are divided into a sub-channel, different transmitting end devices may be allowed to transmit data to a same receiving end device simultaneously by using different sub-channels, thereby reducing a collision probability between different transmitting end devices. Before transmitting data to the receiving end device on a transmission channel, a transmitting end device first needs to access a channel and transmit a contention request frame to the receiving end device. Subsequently, the receiving end device makes a response, and transmits a scheduling frame including transmission channel allocation information to the transmitting end device.

In an existing mechanism, a transmitting end device transmits a contention request frame to a receiving end device on a selected idle sub-channel. Since the receiving end device acquires channel state information about the transmitting end device on the sub-channel via the contention request frame, that is to say, the receiving end device only can acquire channel state information within a certain consecutive frequency band range, which results in that the receiving end device cannot fully utilize channel resources when performing transmission sub-channel allocation. In this way, a throughput rate of the system will be reduced, and a multi-user selection gain cannot be obtained.

SUMMARY

Embodiments of the present invention provide a method and a device for accessing a channel, so as to utilize channel resources effectively, thereby increasing a throughput rate of the system, and achieving a multi-user selection gain.

In a first aspect, a method for accessing a channel is provided, the method includes: receiving, by a receiving end device, a contention request frame transmitted by a first transmitting end device on M sub-carriers, where the M sub-carriers at least have two non-consecutive sub-carriers, and the contention request frame is modulated by the first transmitting end device onto the M sub-carriers; acquiring, by the receiving end device according to the contention request frame, channel state information about the first transmitting end device respectively on the M sub-carriers; determining, by the receiving end device according to the channel state information about the first transmitting end device respectively on the M sub-carriers, channel state information about the first transmitting end device respectively on N sub-carriers, where the N sub-carriers are obtained by dividing all or a part of a system available frequency band, the N sub-carriers include the M sub-carriers, both N and M are positive integers, N>M and M>1; and performing, by the receiving end device, allocation of a transmission sub-channel according to the channel state information about the first transmitting end device respectively on the N sub-carriers.

With reference to the first aspect, in another implementation of the first aspect, a spacing between center frequency points of two adjacent sub-carriers in the M sub-carriers is less than or equal to coherence bandwidth.

With reference to the first aspect and any one of implementations thereof, in another implementation of the first aspect, the determining, by the receiving end device according to the channel state information about the first transmitting end device respectively on the M sub-carriers, channel state information about the first transmitting end device respectively on N sub-carriers includes: determining, by the receiving end device, according to the channel state information about the first transmitting end device respectively on the M sub-carriers and based on a principle of the coherence bandwidth, the channel state information about the first transmitting end device respectively on the N sub-carriers.

With reference to the first aspect and any one of implementations thereof, in another implementation of the first aspect, the performing, by the receiving end device, allocation of a transmission sub-channel according to the channel state information about the first transmitting end device respectively on the N sub-carriers includes: determining, by the receiving end device, values of channel state information about the first transmitting end device on all transmission sub-channels according to the channel state information about the first transmitting end device respectively on the N sub-carriers; and performing, by the receiving end device, the allocation of the transmission sub-channel according to the values of the channel state information about the first transmitting end device on all transmission sub-channels.

With reference to the first aspect and any one of implementations thereof, in another implementation of the first aspect, the performing, by the receiving end device, the allocation of the transmission sub-channel according to the values of the channel state information about the first transmitting end device on all transmission sub-channels includes: when a value of channel state information about the first transmitting end device on a first transmission sub-channel is a maximum value in the values of the channel state information about the first transmitting end device on all transmission sub-channels, allocating, by the receiving end device, the first transmission sub-channel to the first transmitting end device; or when a value of channel state information about the first transmitting end device on a second transmission sub-channel is less than a value of channel state information about a second transmitting end device on the second transmission sub-channel, allocating, by the receiving end device, the second transmission subchannel to the second transmitting end device.

With reference to the first aspect and any one of implementations thereof, in another implementation of the first aspect, after a certain period of time, allocating, by the receiving end device, the second transmission sub-channel to the first transmitting end device.

With reference to the first aspect and any one of implementations thereof, in another implementation of the first aspect, the channel state information includes at least one of: a channel matrix H, a signal to interference plus noise ratio SINR, a signal to noise ratio SNR, and a channel quality indicator CQI.

With reference to the first aspect and any one of implementations thereof, in another implementation of the first aspect, the receiving end device transmits a scheduling frame to the first transmitting end device, where the scheduling frame includes the allocation of the transmission sub-channel, so that the first transmitting end device transmits data on a corresponding transmission sub-channel according to the scheduling frame.

In a second aspect, a method for accessing a channel is provided, the method includes: modulating, by a first transmitting end device, a contention request frame onto M sub-carriers, where the M sub-carriers at least have two non-consecutive sub-carriers; transmitting, by the first transmitting end device, the contention request frame to a receiving end device on the M sub-carriers, so that the receiving end device acquires channel state information about the first transmitting end device respectively on the M sub-carriers according to the contention request frame, determines, according to the channel state information about the first transmitting end device respectively on the M sub-carriers, channel state information about the first transmitting end device respectively on N sub-carriers, where the N sub-carriers are obtained by dividing all or a part of a system available frequency band, the N sub-carriers include the M sub-carriers, both N and M are positive integers, N>M and M>1, and performs allocation of a transmission sub-channel according to the channel state information about the first transmitting end device respectively on the N sub-carriers.

With reference to the second aspect, in another implementation of the second aspect, a spacing between center frequency points of two adjacent sub-carriers in the M sub-carriers is less than or equal to coherence bandwidth.

With reference to the second aspect and any one of implementations thereof, in another implementation of the second aspect, the channel state information includes at least one of: a channel matrix H, a signal to interference plus noise ratio SINR, a signal to noise ratio SNR, and a channel quality indicator CQI.

With reference to the second aspect and any one of implementations thereof, in another implementation of the second aspect, the first transmitting end device receives a scheduling frame transmitted by the receiving end device, where the scheduling frame includes the allocation of the transmission sub-channel; and the first transmitting end device transmits data on a corresponding transmission sub-channel according to the scheduling frame.

In a third aspect, a receiving end device is provided, the receiving end device includes: a receiving unit, configured to receive a contention request frame transmitted by a first transmitting end device on M sub-carriers, where the M sub-carriers at least have two non-consecutive sub-carriers, and the contention request frame is modulated by the first transmitting end device onto the M sub-carriers; an acquiring unit, configured to acquire, according to the contention request frame received by the receiving unit, channel state information about the first transmitting end device respectively on the M sub-carriers; a determining unit, configured to determine, according to the channel state information about the first transmitting end device respectively on the M sub-carriers acquired by the acquiring unit, channel state information about the first transmitting end device respectively on N sub-carriers, where the N sub-carriers are obtained by dividing all or a part of a system available frequency band, the N sub-carriers include the M sub-carriers, both N and M are positive integers, N>M and M>1; and an allocating unit, configured to perform allocation of a transmission sub-channel according to the channel state information about the first transmitting end device respectively on the N sub-carriers as determined by the determining unit.

With reference to the third aspect, in another implementation of the third aspect, a spacing between center frequency points of two adjacent sub-carriers in the M sub-carriers is less than or equal to coherence bandwidth.

With reference to the third aspect and any one of implementations thereof, in another implementation of the third aspect, the determining unit is specifically configured to: determine, according to the channel state information about the first transmitting end device respectively on the M sub-carriers and based on a principle of coherence bandwidth, the channel state information about the first transmitting end device respectively on the N sub-carriers.

With reference to the third aspect and any one of implementations thereof, in another implementation of the third aspect, the determining unit is further configured to: determine values of channel state information about the first transmitting end device on all transmission sub-channels according to the channel state information about the first transmitting end device respectively on the N sub-carriers; and the allocating unit is specifically configured to: perform the allocation of the transmission sub-channel according to the values of the channel state information about the first transmitting end device on all transmission sub-channels.

With reference to the third aspect and any one of implementations thereof, in another implementation of the third aspect, the allocating unit is specifically configured to: when a value of channel state information about the first transmitting end device on a first transmission sub-channel is a maximum value in the values of the channel state information about the first transmitting end device on all transmission sub-channels, allocate by the receiving end device the first transmission sub-channel to the first transmitting end device; or the allocating unit is specifically configured to: when a value of channel state information about the first transmitting end device on a second transmission sub-channel is less than a value of channel state information about a second transmitting end device on the second transmission sub-channel, allocate by the receiving end device the second transmission sub-channel to the second transmitting end device.

With reference to the third aspect and any one of implementations thereof, in another implementation of the third aspect, the allocating unit is further configured to: after a certain period of time, allocate the second transmission sub-channel to the first transmitting end device.

With reference to the third aspect and any one of implementations thereof, in another implementation of the third aspect, the receiving end device further comprises a transmitting unit, and the transmitting unit is configured to transmit a scheduling frame to the first transmitting end device, where the scheduling frame includes the allocation of the transmission sub-channel, so that the first transmitting end device transmits data on a corresponding transmission sub-channel according to the scheduling frame.

In a fourth aspect, a transmitting end device is provided, the transmitting end device includes: a modulating unit, configured to modulate a contention request frame onto M sub-carriers, where the M sub-carriers at least have two non-consecutive sub-carriers; a transmitting unit, configured to transmit the contention request frame modulated by the modulating unit to a receiving end device on the M sub-carriers, so that the receiving end device acquires channel state information about the first transmitting end device respectively on the M sub-carriers according to the contention request frame, determines, according to the channel state information about the first transmitting end device respectively on the M sub-carriers, channel state information about the first transmitting end device respectively on N sub-carriers, where the N sub-carriers are obtained by dividing all or a part of a system available frequency band, the N sub-carriers include the M sub-carriers, both N and M are positive integers, N>M and M>1, and perform allocation of a transmission sub-channel according to the channel state information about the first transmitting end device respectively on the N sub-carriers.

With reference to the fourth aspect, in another implementation of the fourth aspect, a spacing between center frequency points of two adjacent sub-carriers in the M sub-carriers is less than or equal to coherence bandwidth.

With reference to the fourth aspect and any one of implementations thereof, in another implementation of the fourth aspect, the transmitting end device further includes a receiving unit, and the receiving unit is configured to receive a scheduling frame transmitted by the receiving end device, where the scheduling frame includes the allocation of the transmission sub-channel; and the transmitting unit is further configured to: transmit data on a corresponding transmission sub-channel according to the scheduling frame received by the receiving unit.

In embodiments of the present invention, a receiving end device receives a contention request frame transmitted by a first transmitting end device on M sub-carriers, where the M sub-carriers at least have two non-consecutive sub-carriers, and acquires, according to the contention request frame modulated by the first transmitting end device onto the M sub-carriers, channel state information about the first transmitting end device respectively on a plurality of sub-carriers so as to determine channel state information about the first transmitting end device on N sub-carriers obtained by dividing on all or a part of a system available frequency band and perform allocation of a transmission sub-channel. The N sub-carriers include the M sub-carriers, both N and M are positive integers, N>M and M>1. Thus, the embodiments of the present invention enable the receiving end device to acquire full band channel state information by using a plurality of non-consecutive sub-carriers, and effectively utilize channel resources when performing transmission sub-channel allocation, thereby increasing a throughput rate of the system, and achieving a multi-user selection gain.

BRIEF DESCRIPTION OF DRAWINGS

In order to make technical solutions of embodiments of the present invention clearer, accompanying drawings used for description of the embodiments of the present invention or the prior art will be briefly described hereunder. Obviously, the described drawings are merely some embodiments of present invention. For persons skilled in the art, other drawings may be obtained based on these drawings without any creative effort.

DESCRIPTION OF EMBODIMENTS

Technical solutions in embodiments of the present invention will be described hereunder clearly and completely with reference to the accompanying drawings in the embodiments of the present invention. Obviously, the described embodiments are only a part of embodiments of the present invention, rather than all embodiments of the present invention. All other embodiments obtained by persons of ordinary skill in the art based on the embodiments of the present invention without any creative effort shall fall into the protection scope of the present invention.

It should be understood that, the technical solutions in the embodiments of the present invention may be applied in various communication systems, such as a global system of mobile communication (Global System of Mobile communication, GSM), a code division multiple access (Code Division Multiple Access, CDMA) system, a wideband code division multiple access (Wideband Code Division Multiple Access, WCDMA) system, a general packet radio service (General Packet Radio Service, GPRS), a long term evolution (Long Term Evolution, LTE) system, a universal mobile telecommunication system (Universal Mobile Telecommunication System, UMTS), a worldwide interoperability for microwave access (Worldwide Interoperability for Microwave Access, WiMAX) communication system or a wireless fidelity (Wireless Fidelity, WiFi), etc.

In embodiments of the present invention, the transmitting end device may be a user equipment (User Equipment, UE) or a station (Station, STA). The UE may also be referred to as a mobile terminal (Mobile Terminal), a mobile subscriber equipment, etc., which may perform communications with one or more core networks via a radio access network (such as an RAN, Radio Access Network), the user equipment may be a mobile terminal, such as a mobile phone (or referred to as a "cellular" phone) and a computer having a mobile terminal, for instance, may be a portable, pocket-sized, handheld, computer built-in or vehicle-mounted mobile device, and they exchange voices and/or data with the radio access network.

The receiving end device may be a base station, such as a base station (Base Transceiver Station, BTS) in the GSM or the CDMA, a base station (NodeB, NB) in the WCDMA, an evolutional base station (Evolutional Node B, eNB or e-NodeB) in the LTE, or a relay station, and a receiving point may also be an access point (Access Point, AP), but embodiments of the present invention are not limited thereto.

Figure 1:
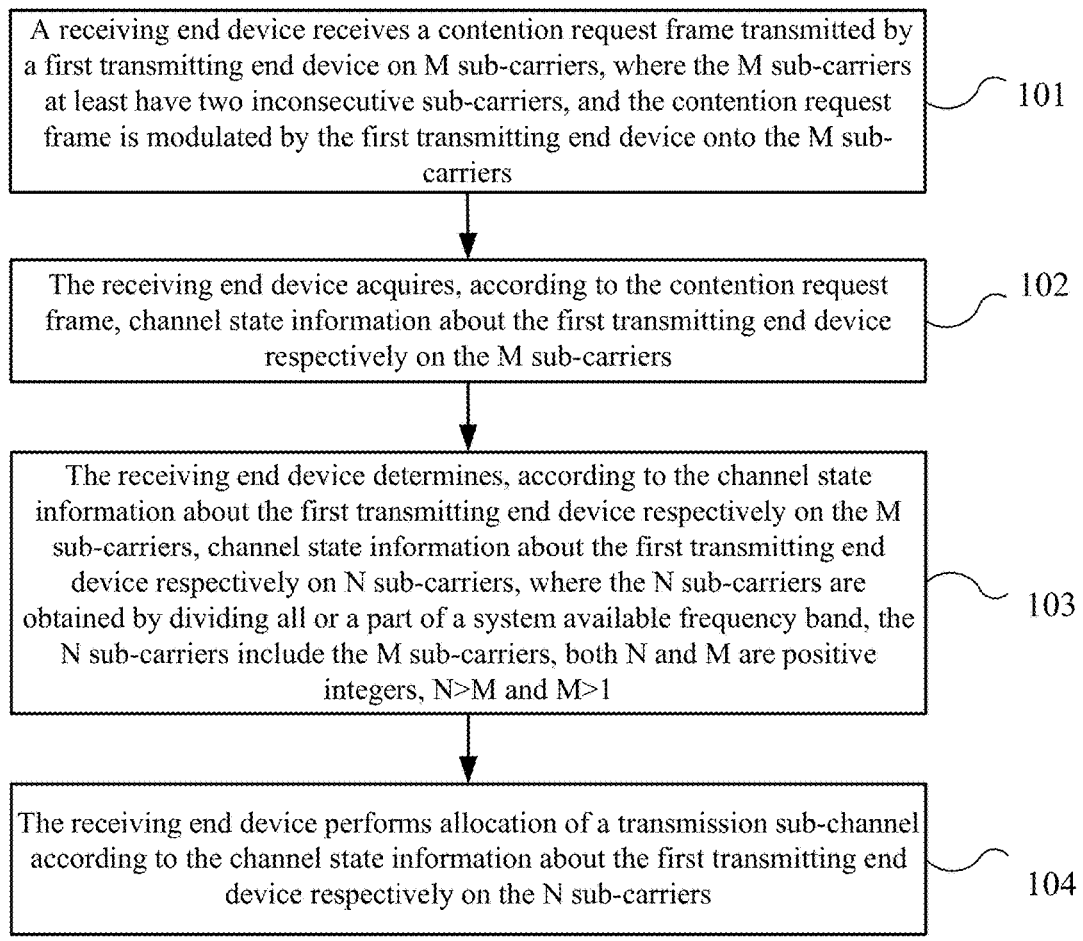
FIG. 1 is a flow chart of a method for accessing a channel according to an embodiment of the present invention.

FIG. 1 is a flow chart of a method for accessing a channel according to an embodiment of the present invention. The method as shown in FIG. 1 is performed by a receiving end device (such as a base station or an AP).

101, a receiving end device receives a contention request frame transmitted by a first transmitting end device on M sub-carriers, where the M sub-carriers at least have two non-consecutive sub-carriers, and the contention request frame is modulated by the first transmitting end device onto the M sub-carriers.

102, the receiving end device acquires, according to the contention request frame, channel state information about the first transmitting end device respectively on the M sub-carriers.

103, the receiving end device determines, according to the channel state information about the first transmitting end device respectively on the M sub-carriers, channel state information about the first transmitting end device respectively on N sub-carriers, where the N sub-carriers are obtained by dividing all or a part of a system available frequency band, the N sub-carriers include the M sub-carriers, both N and M are positive integers, N>M and M>1.

104, the receiving end device performs allocation of a transmission sub-channel according to the channel state information about the first transmitting end device respectively on the N sub-carriers.

In an embodiment of the present invention, a receiving end device receives a contention request frame transmitted by a first transmitting end device on M sub-carriers, where the M sub-carriers at least have two non-consecutive sub-carriers, and acquires, according to the contention request frame modulated by the first transmitting end device onto the M sub-carriers, channel state information about the first transmitting end device respectively on a plurality of sub-carriers so as to determine channel state information about the first transmitting end device on N sub-carriers obtained by dividing all or a part of a system available frequency band and perform allocation of a transmission sub-channel. The N sub-carriers include the M sub-carriers, both N and M are positive integers, N>M and M>1. In an existing mechanism, the receiving end device acquires channel state information about a first transmitting end device within a certain consecutive frequency band range, and the channel state information about the first transmitting end device within the certain consecutive frequency band range is similar, thus the channel state information about the first transmitting end device acquired by the receiving end device is incomplete and limited, which results in that channel resources cannot be effectively utilized when transmission sub-channel allocation is performed. However, the embodiment of the present invention enables the receiving end device to acquire full band channel state information by using a plurality of non-consecutive sub-carriers, and effectively utilize the channel resources when performing transmission sub-channel allocation, thereby increasing a throughput rate of the system, and achieving a multi-user selection gain.

It should be noted that, the full band herein indicates all or a part of a system available frequency band, that is, the full band is divided into the N sub-carriers described above, and it should be understood that, the embodiment of the present invention will not limit bandwidth size of the full band.

In the embodiment of the present invention, the sub-channel formed by the above M sub-carriers is called as a discrete sub-channel, the N sub-carriers may be divided into one or more discrete sub-channels, the number of sub-carriers included in different discrete sub-channels may be the same or different, and different transmitting end devices may transmit contention request frames on different discrete sub-channels. In step 101, in other words, the receiving end device receives a contention request frame transmitted by the first transmitting end device on a certain discrete sub-channel obtained by dividing the N sub-carriers.

Optionally, as an embodiment, a spacing between center frequency points of two adjacent sub-carriers in the M sub-carriers may be less than or equal to coherence bandwidth.

Specifically, when the M sub-carriers include a sub-carrier with a lowest frequency point and a sub-carrier with a highest frequency point in the N sub-carriers, a spacing (an interval) between center frequency points of two adjacent sub-carriers in the M sub-carriers is less than or equal to the coherence bandwidth.

Or, when the M sub-carriers include a sub-carrier with a lowest frequency point in the N sub-carriers but do not include a sub-carrier with a highest frequency point in the N sub-carriers, a spacing between center frequency points of two adjacent sub-carriers in the M sub-carriers is less than or equal to the coherence bandwidth, and a spacing between center frequency points of a sub-carrier with a highest frequency point in the M sub-carriers and the sub-carrier with the highest frequency point in the N sub-carriers is less than or equal to the coherence bandwidth.

Or, when the M sub-carriers include a sub-carrier with a highest frequency point in the N sub-carriers but do not include a sub-carrier with a lowest frequency point in the N sub-carriers, a spacing between center frequency points of two adjacent sub-carriers in the M sub-carriers is less than or equal to the coherence bandwidth, and a spacing between center frequency points of a sub-carrier with a lowest frequency point in the M sub-carriers and the sub-carrier with the lowest frequency point in the N sub-carriers is less than or equal to the coherence bandwidth.

Or, when the M sub-carriers neither include a sub-carrier with a highest frequency point in the N sub-carriers nor include a sub-carrier with a lowest frequency point in the N sub-carriers, a spacing between center frequency points of two adjacent sub-carriers in the M sub-carriers is less than or equal to the coherence bandwidth, a spacing between center frequency points of a sub-carrier with a lowest frequency point in the M sub-carriers and the sub-carrier with the lowest frequency point in the N sub-carriers is less than or equal to the coherence bandwidth, and a spacing between center frequency points of the sub-carrier with the highest frequency point in the M sub-carriers and the sub-carrier with the highest frequency point in the N sub-carriers is less than or equal to the coherence bandwidth.

Figure 2:
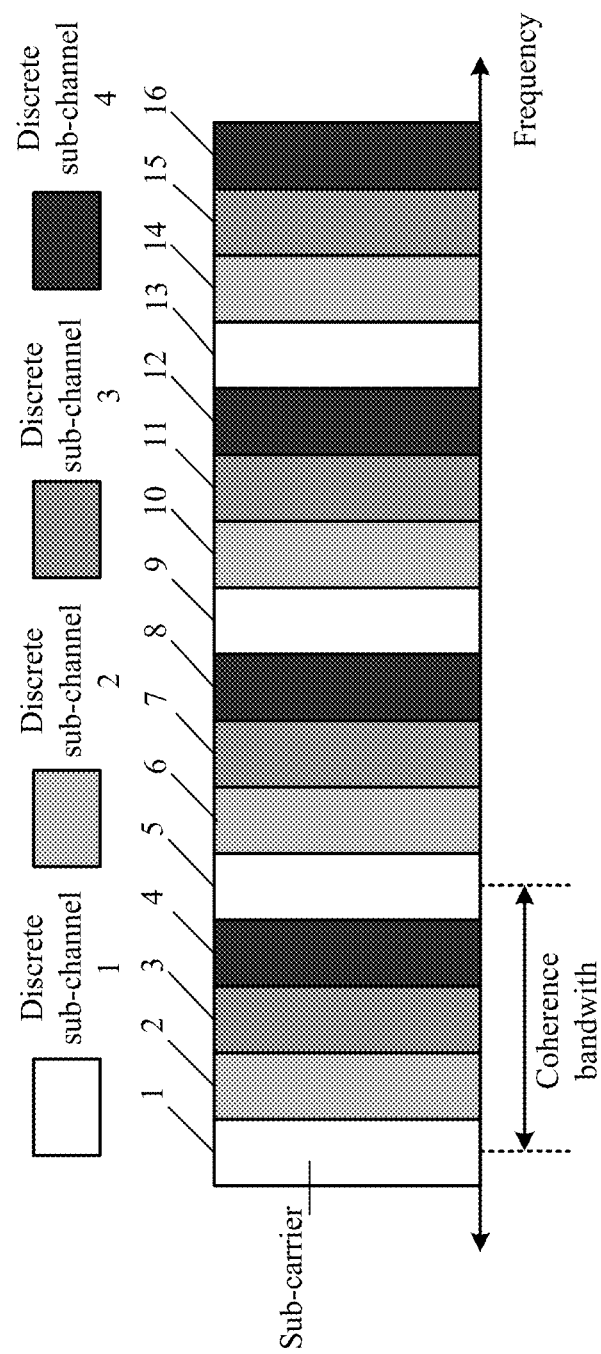
FIG. 2 is a schematic diagram of dividing channel resources by discrete sub-channels according to an embodiment of the present invention.

For instance, as shown in FIG. 2, all or a part of a system available frequency band (channel) includes sixteen sub-carriers, that is, a value of the N is 16. The sixteen sub-carriers are divided into four discrete sub-channels, which are respectively are a discrete sub-channel 1, a discrete sub-channel 2, a discrete sub-channel 3 and a discrete sub-channel 4, the number of sub-carriers included in a certain discrete sub-channel is then a value of the M, and the first transmitting end device transmits a contention request frame to the receiving end device on a certain discrete sub-channel. For ease of description, assuming herein that each discrete sub-channel includes 4 sub-carriers, the discrete sub-channel 1 includes a sub-carrier 1, a sub-carrier 5, a sub-carrier 9 and a sub-carrier 13; the discrete sub-channel 2 includes a sub-carrier 2, a sub-carrier 6, a sub-carrier 10 and a sub-carrier 14; the discrete sub-channel 3 includes a sub-carrier 3, a sub-carrier 7, a sub-carrier 11 and a sub-carrier 15; and the discrete sub-channel 4 includes a sub-carrier 4, a sub-carrier 8, a sub-carrier 12 and a sub-carrier 16. Bandwidth occupied by four sub-carriers is equal to the coherence bandwidth. In a plurality of non-consecutive sub-carriers on a same discrete sub-channel, a spacing between center frequency points of two adjacent sub-carriers is four sub-carriers, i.e. the coherence bandwidth (between center frequency points of the sub-carrier 1 and the sub-carrier 5 of the discrete sub-channel 1 as shown in FIG. 2). Furthermore, if the four sub-carriers of the discrete sub-channel 1 do not include the sub-carrier 16 with the highest frequency point in the sixteen sub-carriers, a spacing between center frequency points of the sub-carrier 13 with the highest frequency point in the four sub-carriers of the discrete sub-channel 1 and the sub-carrier 16 is less than the coherence bandwidth. For another example, the four sub-carriers of the discrete sub-channel 4 do not include the sub-carrier 1 with the lowest frequency point in the sixteen sub-carriers, a spacing between center frequency points of the sub-carrier 4 with the lowest frequency point in the four sub-carriers of the discrete sub-channel 4 and the sub-carrier 1 is less than the coherence bandwidth, and so on.

Certainly, an interval between center frequency points of two adjacent sub-carriers may also be less than the coherence bandwidth, for instance, an interval of three or two sub-carriers, and the embodiment of the present invention will not be limited thereto.

It should be noted that, the example as shown in FIG. 2 is merely exemplary, which is not intended for limiting the scope of the present invention. It should be understood that, embodiments of the present invention will not make a limitation to the number of discrete sub-channels, the number of sub-carriers included in each discrete sub-channel, an interval between two non-consecutive sub-carriers adjacent in a same discrete sub-channel, etc. It should also be noted that, the number of multiple sub-carriers included in different discrete sub-channels may be the same or different.

Optionally, design information about the above discrete sub-channels may be pre-agreed by a receiving end device and a transmitting end device, and design of the discrete sub-channels may also be performed by a network side device (such as the above receiving end device), the design information about the discrete sub-channels is transmitted to a plurality of transmitting end devices in a form of broadcasting, and the first transmitting end device is any one of the plurality of the transmitting end devices. It should be understood that, the embodiment of the present invention will not make a limitation. The first transmitting end device may select a discrete sub-channel from the plurality of discrete sub-channels according to the design information about the discrete sub-channels and transmit a contention request frame.

Optionally, the channel state information may include at least one of: a channel matrix (H), a signal to interference plus noise ratio (SINR), a signal to noise ratio (SNR), a channel quality indicator (CQI), etc., and it should be understood that, the embodiment of the present invention will not be limited thereto.

Optionally, in step 103, the receiving end device may determine channel state information about the first transmitting end device respectively on the N sub-carriers based on a principle of coherence bandwidth according to the channel state information about the first transmitting end device respectively on the M sub-carriers.

Taking a designing approach for discrete sub-channels in FIG. 2 as an example, the first transmitting end device selects the discrete sub-channel 1 to transmit a contention request frame, and modulates the contention request frame onto four sub-carriers (the sub-carrier 1, the sub-carrier 5, the sub-carrier 9 and the sub-carrier 13, that is, M=4) of the discrete sub-channel 1 for transmission. An interval between center frequency points of two non-consecutive sub-carriers adjacent on the discrete sub-channel 1 is less than or equal to the coherence bandwidth. The receiving end device acquires channel state information about the first transmitting end device respectively on the four sub-carriers of the discrete sub-channel 1 according to the contention request frame, and determines channel state information about the first transmitting end device respectively on all sub-carriers (that is, N=16 sub-carriers included in the four discrete sub-channels) by a principle of coherence bandwidth, i.e. including channel state information about the first transmitting end device on sub-carriers of the discrete sub-channel 1 and other discrete sub-channels 2-4. Optionally, channel state information about the first transmitting end device respectively on a plurality of sub-carriers within the coherence bandwidth may be deemed as approximately equal, may be obtained through interpolation (such as linear interpolation) of the channel state information about the first transmitting end device respectively on two non-consecutive sub-carriers adjacent on the discrete channel 1; or, may be obtained via channel state information about the first transmitting end device on a neighboring sub-carrier of the discrete sub-channel 1 (for instance, equal to the channel state information about the first transmitting end device on the neighboring sub-carrier), and it should be understood that, embodiments of the present invention will not be limited thereto.

For instance, the receiving end device acquires an SINR of the first transmitting end device on the sub-carrier 1 and an SINR on the sub-carrier 5 according to the contention request frame, and through a coherent principle, the receiving end device may estimate SINRs of the first transmitting end device respectively on the sub-carriers 2-4. Optionally, the SINRs may be obtained through interpolation (such as linear interpolation) of the SINR of the first transmitting end device on the sub-carrier 1 and the SINR on the sub-carrier 5. Similarly, SINRs of the first transmitting end device respectively on the sub-carriers 6-8 may be obtained through interpolation of the SINR on the sub-carrier 5 and the SINR on the sub-carrier 9. SINRs of the first transmitting end device respectively on the sub-carriers 10-12 may be obtained through interpolation of the SINR on the sub-carrier 9 and the SINR on the sub-carrier 13. SINRs of the first transmitting end device respectively on the sub-carriers 13-16 may be obtained based on the SINR on the sub-carrier 13, and so on.

According to the above solution, in a case where an interval between center frequency points of two adjacent sub-carriers in a plurality of non-consecutive sub-carriers on a discrete sub-channel is less than or equal to coherence bandwidth, the receiving end device may acquire full band channel state information about the first transmitting end device based on a principle of coherence bandwidth, and similarly, the receiving end device may also acquire full band channel state information about other transmitting end devices. In this way, the receiving end device selects a transmission sub-channel used for data transmission for the transmitting end device based on the full band channel state information about the transmitting end device, channel resources can be effectively utilized, thereby increasing a throughput rate of the system, and achieving a multi-user selection gain.

Optionally, as another embodiment, in step 104, the receiving end device may determine values of the channel state information about the first transmitting end device on all transmission sub-channels according to the channel state information about the first transmitting end device respectively on the N sub-carriers; and allocate the transmission sub-channel according to the values of the channel state information about the first transmitting end device on all transmission sub-channels.

It should be noted that, the embodiment of the present invention will not make a limitation to a design approach for transmission sub-channels either, the transmission sub-channel may include a plurality of consecutive sub-carriers, may also include a plurality of non-consecutive sub-carriers, and may also include only one sub-carrier. Optionally, a value of channel state information about a transmitting end device on a certain transmission sub-channel may be an average value of channel state information about the transmitting end device on all sub-carriers of the transmission sub-channel.

Optionally, when a value of channel state information about the first transmitting end device on a first transmission sub-channel is a maximum value in the values of the channel state information about the first transmitting end device on all transmission sub-channels, the receiving end device may allocate the first transmission sub-channel to the first transmitting end device; or, when a value of channel state information about the first transmitting end device on a second transmission sub-channel is less than a value of channel state information about a second transmitting end device on the second transmission sub-channel, the receiving end device may allocate the second transmission sub-channel to the second transmitting end device.

It should be understood that, the embodiment of the present invention will not make a limitation to how a receiving end device performs transmission sub-channel allocation according to channel state information.

A plurality of paths will be generated due to reflection or scattering of wireless signals in a transmission process, which results in a difference in receiving channel state information on different sub-carriers for wireless signals transmitted with same power. Moreover, the higher a value of the channel state information, the easier a receiving end device modulates the wireless signals correctly. Thus, through acquiring values of full band channel state information about different transmitting end devices and allocating transmission sub-channels for different transmitting end devices based on the values of the full band channel state information, the receiving end device can utilize channel resources effectively, thereby increasing a throughput rate of the system, and achieving a multi-user selection gain.

Optionally, as another embodiment, after step 103, the receiving end device may transmit a scheduling frame to the first transmitting end device, where the scheduling frame includes allocation of a transmission sub-channel. The first transmitting end device transmits data to the receiving end device on a corresponding transmission sub-channel according to allocation information in the scheduling frame.

It should be noted that, after a receiving end device receives a contention request frame transmitted by a transmitting end device, the receiving end device may transmit a scheduling frame to the transmitting end device multiple times, as described in the above example, the receiving end device first allocates a transmission sub-channel to a second transmitting end device and transmits the scheduling frame to a plurality of transmitting end devices in a form of broadcasting, and after a certain period of time, allocates the transmission sub-channel to a first transmitting end device, and then transmits the scheduling frame to a plurality of transmitting end devices in a form of broadcasting. The embodiment of the present invention will not make a limitation to the times the receiving end device transmits the scheduling frame.

It should also be noted that, when a plurality of transmitting end devices transmit contention request frames on a same discrete sub-channel, since the discrete sub-channel only allows one transmitting end device to transmit a contention request frame, there may be a case where the contention request frame fails to be transmitted on the transmitting end device, the transmitting end device may transmit the contention request frame multiple times. The embodiment of the present invention will not make a limitation to the times the transmitting end device transmits the contention request frame.

Embodiments of the present invention will be described hereunder in more detail with reference to examples as shown in FIG. 4-FIG. 9.

Figure 3:
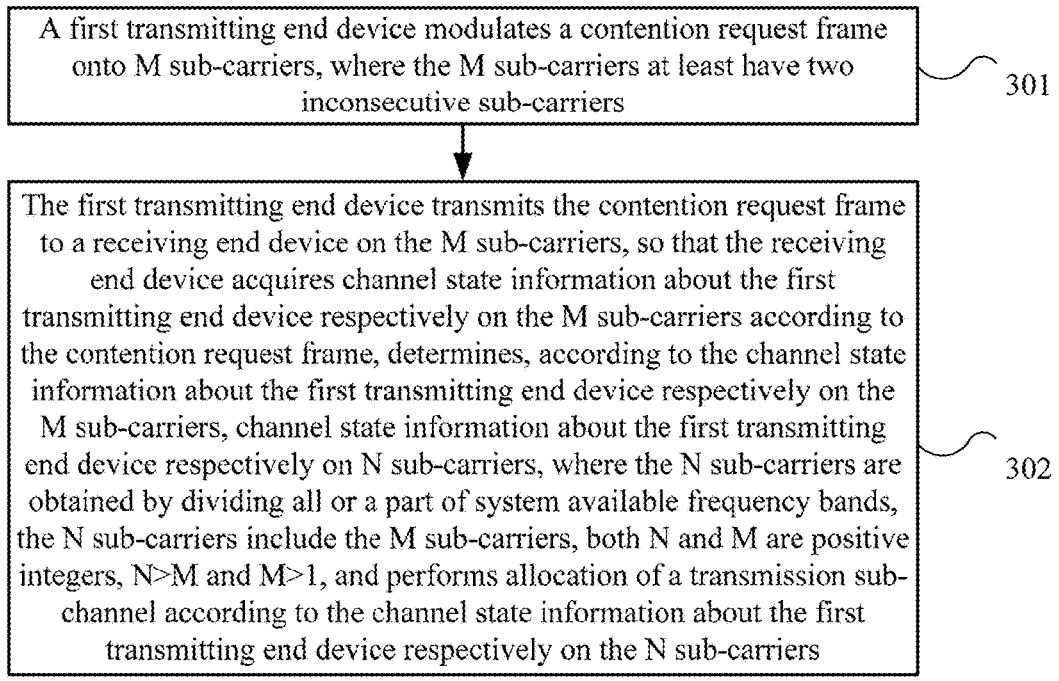
FIG. 3 is a flow chart of a method for accessing a channel according to an embodiment of the present invention.
Figure 4:
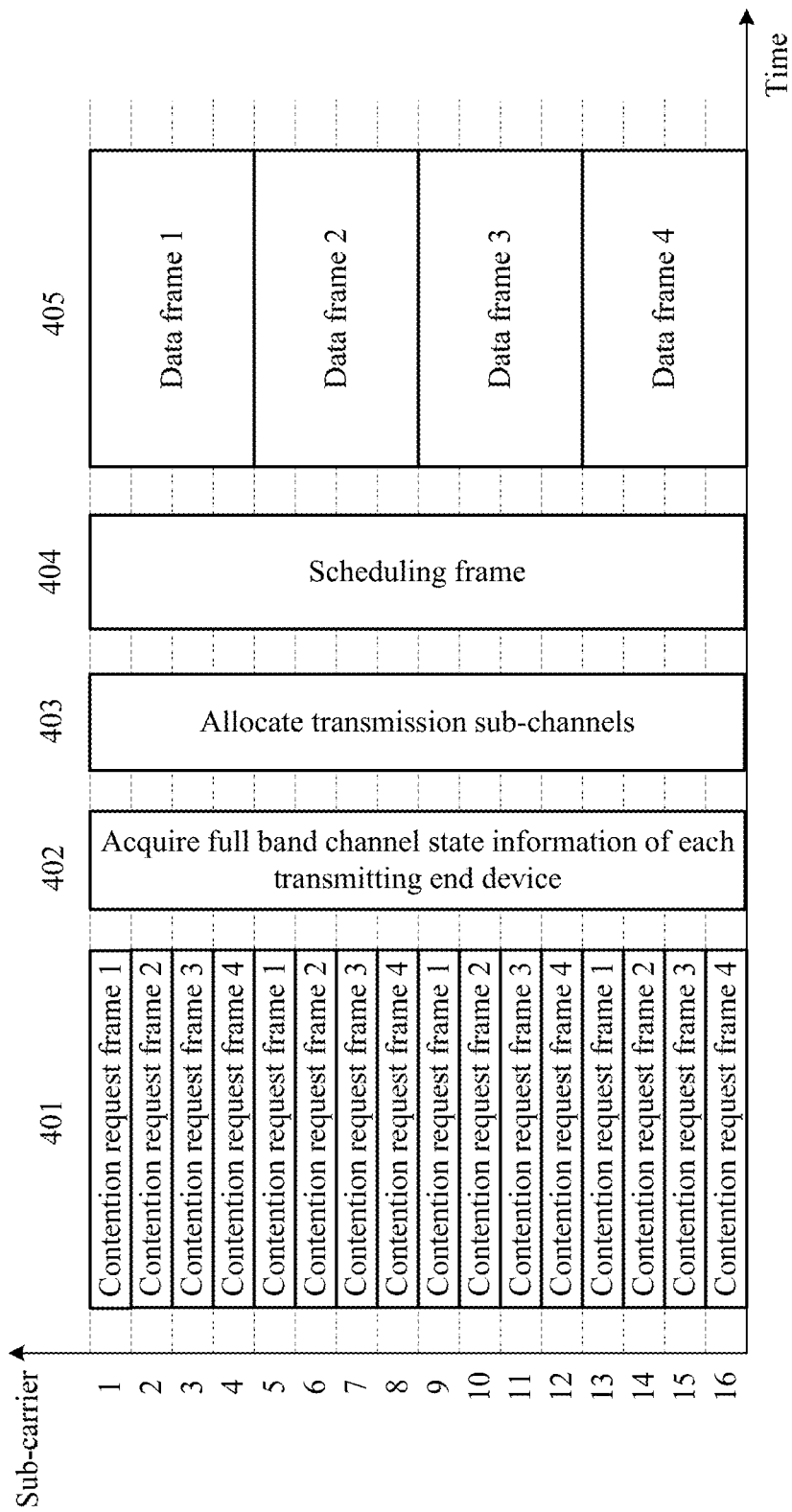
FIG. 4 is a flow chart of a process of a method for accessing a channel according to an embodiment of the present invention.

FIG. 3 is a flow chart of a method for accessing a channel according to another embodiment of the present invention. The method as shown in FIG. 4 is performed by a transmitting end device (such as a UE or an STA), which is corresponding to the method as shown in FIG. 1, thus, repetitive descriptions of the embodiment as shown in FIG. 1 will be omitted properly.

301, a first transmitting end device modulates a contention request frame onto M sub-carriers, where the M sub-carriers at least have two non-consecutive sub-carriers.

302, the first transmitting end device transmits the contention request frame to a receiving end device on the M sub-carriers, so that the receiving end device acquires channel state information about the first transmitting end device respectively on the M sub-carriers according to the contention request frame, determines, according to the channel state information about the first transmitting end device respectively on the M sub-carriers, channel state information about the first transmitting end device respectively on N sub-carriers, where the N sub-carriers are obtained by dividing all or a part of a system available frequency band, the N sub-carriers include the M sub-carriers, both N and M are positive integers, N>M and M>1, and performs allocation of a transmission sub-channel according to the channel state information about the first transmitting end device respectively on the N sub-carriers.

In an embodiment of the present invention, a first transmitting end device modulates a contention request frame onto M sub-carriers, and transmits the contention request frame to a receiving end device on the M sub-carriers, where the M sub-carriers at least have two non-consecutive sub-carriers. In this way, the receiving end device acquires channel state information about the first transmitting end device respectively on a plurality of sub-carriers through the contention request frame modulated by the first transmitting end device onto the M sub-carriers so as to determine channel state information about the first transmitting end device on N sub-carriers obtained by dividing all or a part of a system available frequency band and perform transmission sub-channel allocation. The N sub-carriers include the M sub-carriers, both N and M are positive integers, N>M and M>1. Thus, the embodiment of the present invention enables the receiving end device to acquire full band channel state information by using a plurality of non-consecutive sub-carriers, and effectively utilize channel resources when performing transmission sub-channel allocation, thereby increasing a throughput rate of the system, and achieving a multi-user selection gain.

It should be noted that, the full band herein indicates all or a part of a system available frequency band, that is, the full band is divided into the N sub-carriers described above, and it should be understood that, the embodiment of the present invention will not limit bandwidth size of the full band.

In the embodiment of the present invention, the sub-channel formed by the above M sub-carriers is called as a discrete sub-channel, the N sub-carriers may be divided into one or more discrete sub-channels, the number of sub-carriers included in different discrete sub-channels may be the same or different, and different transmitting end devices may transmit contention request frames on different discrete sub-channels. In step 301, in other words, the first transmitting end device modulates the contention request frame onto the M sub-carriers included in a certain discrete sub-channel obtained by dividing the N sub-carriers.

Optionally, as an embodiment, a spacing between center frequency points of two adjacent sub-carriers in the M sub-carriers may be less than or equal to coherence bandwidth. Reference may be made to the above descriptions for a specific embodiment, which will not be repeated herein.

Optionally, design information about the discrete sub-channel (i.e. information about the N sub-carriers being divided into one or more discrete sub-channels) may be pre-agreed by a receiving end device and a transmitting end device, and design of the discrete sub-channel may also be performed by a network side device (such as the above receiving end device), the design information about the discrete sub-channel is transmitted to a plurality of transmitting end devices in a form of broadcasting, and the first transmitting end device is any one of the plurality of the transmitting end devices. It should be understood that, the embodiment of the present invention will not make a limitation. In step 302, the first transmitting end device may select a discrete sub-channel from a plurality of discrete sub-channels obtained by dividing the N sub-carriers according to the design information about the discrete sub-channel and transmit the contention request frame.

According to the above solution, in a case where an interval between center frequency points of two adjacent sub-carriers in a plurality of non-consecutive sub-carriers on a discrete sub-channel is less than or equal to coherence bandwidth, the receiving end device may acquire full band channel state information about the first transmitting end device based on a principle of coherence bandwidth. In this way, the receiving end device selects a transmission sub-channel used for data transmission for the transmitting end device based on the full band channel state information about the transmitting end device, channel resources can be effectively utilized, thereby increasing a throughput rate of the system, and achieving a multi-user selection gain.

Optionally, the channel state information may include at least one of: a channel matrix H, an SINR, an SNR, a CQI, etc., and it should be understood that, the embodiment of the present invention will not be limited thereto.

Optionally, as another embodiment, after step 402, the first transmitting end device may receive a scheduling frame transmitted by the receiving end device, where the scheduling frame includes the allocation of the transmission sub-channel. The first transmitting end device transmits data to the receiving end device on a corresponding transmission sub-channel according to allocation information in the scheduling frame.

It should be noted that, after a receiving end device receives a contention request frame transmitted by a transmitting end device, the receiving end device may transmit a scheduling frame to the transmitting end device multiple times. The embodiment of the present invention will not limit the times the receiving end device transmits the scheduling frame.

It should also be noted that, when a plurality of transmitting end devices transmit contention request frames on a same discrete sub-channel, since the discrete sub-channel only allows one transmitting end device to transmit a contention request frame, there may be a case where the contention request frame fails to be transmitted on the transmitting end device, the transmitting end device may transmit the contention request frame multiple times. The embodiment of the present invention will not limit the times the transmitting end device transmits the contention request frame.

Taking the above dividing approach for discrete sub-channels in FIG. 2 as an example, embodiments of the present invention will be described hereunder in more detail with reference to examples in FIG. 4-FIG. 9. In the examples as shown in FIG. 4-FIG. 9, the channel state information being SINR, the number of transmitting end devices, the number of discrete sub-channels, the number of sub-carriers included in the discrete sub-channels, a value of the SINR, etc., are merely exemplary, but not intended for limiting the scope of the present invention.

Figure 5:
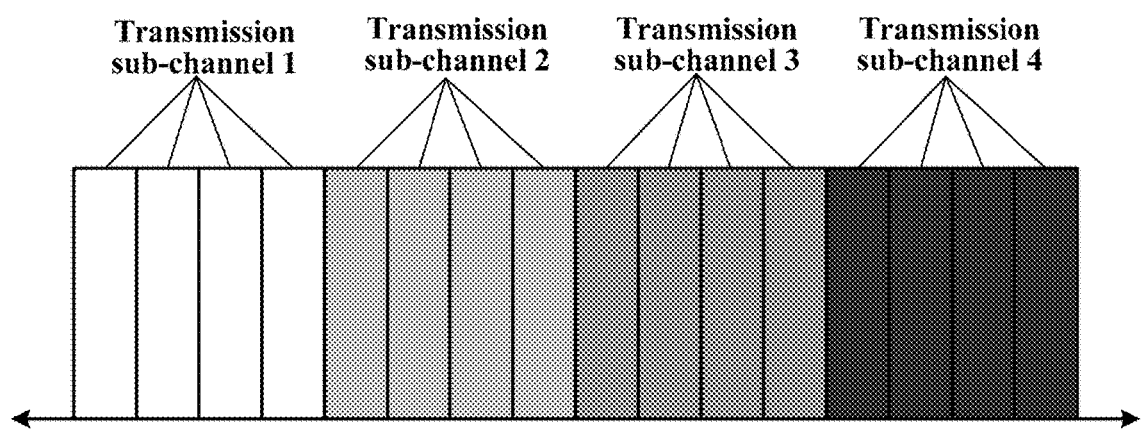
FIG. 5 is a schematic diagram of dividing channel resources by transmission sub-channels according to an embodiment of the present invention.

In an example as shown in FIG. 4, for ease of description, assuming that there are totally sixteen sub-carriers available in a system, FIG. 2 is taken as an example for division of discrete sub-channels, FIG. 5 is taken as an example for division of transmission sub-channels, the channel state information is SINR, and a scenario where four transmitting end devices need to transmit data frames to one receiving end device is taken as an example, it should be understood that, embodiments of the present invention will not be limited thereto.

Step 401, each transmitting end device selects a discrete sub-channel to transmit a contention request frame to the receiving end device.

A transmitting end device 1 selects a discrete sub-channel 1 (including a sub-carrier 1, a sub-carrier 5, a sub-carrier 9 and a sub-carrier 13) to transmit a contention request frame 1; a transmitting end device 2 selects a discrete sub-channel 2 (including a sub-carrier 2, a sub-carrier 6, a sub-carrier 10 and a sub-carrier 14) to transmit a contention request frame 2; a transmitting end device 3 selects a discrete sub-channel 3 (including a sub-carrier 3, a sub-carrier 7, a sub-carrier 11 and a sub-carrier 15) to transmit a contention request frame 3; and a transmitting end device 4 selects a discrete sub-channel 4 (including a sub-carrier 4, a sub-carrier 8, a sub-carrier 12 and a sub-carrier 16) to transmit a contention request frame 4.

It should be noted that, descriptions on a corresponding relation among a serial number of a transmitting end device, a serial number of a contention request frame, a serial number of a sub-carrier and a serial number of a discrete sub-channel is merely intended for helping those skilled in the art to understood, rather than limiting the scope of the present invention, for instance, the transmitting end device 1 may also select other discrete sub-channels apart from the discrete sub-channel 1 to transmit the contention request frame, and a specific location of a sub-carrier included in a discrete sub-channel is not limited either.

Step 402, the receiving end device determines full band channel state information of the four transmitting end devices according to the four contention request frames received.

For instance, the receiving end device acquires measurement values of SINR of the transmitting end device 1 on the sub-carrier 1, the sub-carrier 5, the sub-carrier 9 and the sub-carrier 13 according to the contention request frame 1, which are respectively 15 dB, 11 dB, 13 dB and 7 dB. Since both an interval between center frequency points of two adjacent sub-carriers of the discrete sub-channel 1 and an interval between center frequency points of the sub-carrier 13 and the sub-carrier 16 are less than or equal to coherence bandwidth, SINRs of the transmitting end device 1 on other sub-carriers may be estimated by linear interpolation according to a principle of coherence bandwidth. By linear interpolation of SINR values of the transmitting end device 1 on the sub-carrier 1 and the sub-carrier 5, it is obtained that an SINR value of the transmitting end device 1 on the sub-carrier 2 is 14 dB, an SINR value on the sub-carrier 3 is 13 dB, and an SINR value on the sub-carrier 4 is 12 dB; by linear interpolation of SINR values of the transmitting end device 1 on the sub-carrier 5 and the sub-carrier 9, it is obtained that an SINR value of the transmitting end device 1 on the sub-carrier 6 is 11.5 dB, an SINR value on the sub-carrier 7 is 12 dB, and an SINR value on the sub-carrier 8 is 12.5 dB; by linear interpolation of SINR values of the transmitting end device 1 on the sub-carrier 9 and the sub-carrier 13, it is obtained that an SINR value of the transmitting end device 1 on the sub-carrier 10 is 11.5 dB, an SINR value on the sub-carrier 11 is 12 dB, and an SINR value on the sub-carrier 12 is 8.5 dB; and through the SINR value of the transmitting end device 1 on the sub-carrier 13, it is obtained that SINR values of the transmitting end device 1 on the sub-carriers 14-16 are all 7 dB.

Similarly, the receiving end device acquires measurement values of SINR of the transmitting end device 2 on the sub-carrier 2, the sub-carrier 6, the sub-carrier 10 and the sub-carrier 14 according to the contention request frame 2, which are respectively 6 dB, 16 dB, 14 dB and 6 dB. Since an interval between center frequency points of two adjacent sub-carriers of the discrete sub-channel 2, an interval between center frequency points of the sub-carrier 2 and the sub-carrier 1 and an interval between center frequency points of the sub-carrier 14 and the sub-carrier 16 are less than or equal to the coherence bandwidth, SINRs of the transmitting end device 2 on other sub-carriers may be estimated by linear interpolation according to the principle of coherence bandwidth. Through the SINR value of the transmitting end device 2 on the sub-carrier 2, it is obtained that an SINR value of the transmitting end device 2 on the sub-carrier 1 is 6 dB; by linear interpolation of SINR values of the transmitting end device 2 on the sub-carrier 2 and the sub-carrier 6, it is obtained that an SINR value of the transmitting end device 2 on the sub-carrier 3 is 8.5 dB, an SINR value on the sub-carrier 4 is 11 dB and an SINR value on the sub-carrier 5 is 13.5 dB; by linear interpolation of SINR values of the transmitting end device 2 on the sub-carrier 6 and the sub-carrier 10, it is obtained that an SINR value of the transmitting end device 2 on the sub-carrier 7 is 15.5 dB, an SINR value on the sub-carrier 8 is 15 dB and an SINR value on the sub-carrier 9 is 14.5 dB; by linear interpolation of SINR values of the transmitting end device 2 on the sub-carrier 10 and the sub-carrier 14, it is obtained that an SINR value of the transmitting end device 2 on the sub-carrier 11 is 12 dB, an SINR value on the sub-carrier 12 is 10 dB and an SINR value on the sub-carrier 13 is 8 dB; and through the SINR value of the transmitting end device 2 on the sub-carrier 14, it is obtained that both SINR values of the transmitting end device 2 on the sub-carriers 15 and 16 are 6 dB.

Similarly, the receiving end device acquires measurement values of SINR of the transmitting end device 3 on the sub-carrier 3, the sub-carrier 7, the sub-carrier 11 and the sub-carrier 15 according to the contention request frame 3, which are respectively 7 dB, 13 dB, 17 dB and 9 dB. Since an interval between center frequency points of two adjacent sub-carriers of the discrete sub-channel 3, an interval between center frequency points of the sub-carrier 3 and the sub-carrier 1 and an interval between center frequency points of the sub-carrier 15 and the sub-carrier 16 are less than or equal to the coherence bandwidth, SINRs of the transmitting end device 3 on other sub-carriers may be estimated by linear interpolation according to the principle of coherence bandwidth. The receiving end device obtains that SINR values of the transmitting end device 3 on the sub-carriers 1-16 are respectively 7 dB, 7 dB, 7 dB, 8.5 dB, 10 dB, 11.5 dB, 13 dB, 14 dB, 15 dB, 16 dB, 17 dB, 15 dB, 13 dB, 11 dB, 9 dB and 9 dB.

Similarly, the receiving end device acquires measurement values of SINR of the transmitting end device 4 on the sub-carrier 4, the sub-carrier 8, the sub-carrier 12 and the sub-carrier 16 according to the contention request frame 4, which are respectively 9 dB, 5 dB, 13 dB and 15 dB. Since both an interval between center frequency points of two adjacent sub-carriers of the discrete sub-channel 4 and an interval between center frequency points of the sub-carrier 4 and the sub-carrier 1 are less than or equal to the coherence bandwidth, SINRs of the transmitting end device 4 on other sub-carriers may be estimated by linear interpolation according to the principle of coherence bandwidth. The receiving end device obtains that SINR values of the transmitting end device 4 on the sub-carriers 1-16 are respectively 9 dB, 9 dB, 9 dB, 9 dB, 8 dB, 7 dB, 6 dB, 5 dB, 7 dB, 9 dB, 11 dB, 13 dB, 13.5 dB, 1 4 dB, 14.5 dB and 15 dB.

The SINR values of the transmitting end devices 1-4 on the sub-carriers may be illustrated as shown in Table 1:

TABLE 1

|  | Transmitting end device 1 | Transmitting end device 2 | Transmitting end device 3 | Transmitting end device 4 |
| --- | --- | --- | --- | --- |
| Sub-carrier 1 | 15 dB | 6 dB | 7 dB | 9 dB |
| Sub-carrier 2 | 14 dB | 6 dB | 7 dB | 9 dB |
| Sub-carrier 3 | 13 dB | 8.5 dB | 7 dB | 9 dB |
| Sub-carrier 4 | 12 dB | 11 dB | 8.5 dB | 9 dB |

TABLE 1-continued

|  | Transmitting end device 1 | Transmitting end device 2 | Transmitting end device 3 | Transmitting end device 4 |
|---|---|---|---|---|
| Sub-carrier 5 | 11 dB | 13.5 dB | 10 dB | 8 dB |
| Sub-carrier 6 | 11.5 dB | 16 dB | 11.5 dB | 7 dB |
| Sub-carrier 7 | 12 dB | 15.5 dB | 13 dB | 6 dB |
| Sub-carrier 8 | 12.5 dB | 15 dB | 14 dB | 5 dB |
| Sub-carrier 9 | 13 dB | 14.5 dB | 15 dB | 7 dB |
| Sub-carrier 10 | 11.5 dB | 14 dB | 16 dB | 9 dB |
| Sub-carrier 11 | 10 dB | 12 dB | 17 dB | 11 dB |
| Sub-carrier 12 | 8.5 dB | 10 dB | 15 dB | 13 dB |
| Sub-carrier 13 | 7 dB | 8 dB | 13 dB | 13.5 dB |
| Sub-carrier 14 | 7 dB | 6 dB | 11 dB | 14 dB |
| Sub-carrier 15 | 7 dB | 6 dB | 9 dB | 14.5 dB |
| Sub-carrier 16 | 7 dB | 6 dB | 9 dB | 15 dB |

Step 403, the receiving end device allocates transmission sub-channels according to the SINR values of the transmitting end devices on all sub-carriers as determined in step 402. Taking a dividing approach for transmission channel in FIG. 5 as an example, sixteen sub-carriers are divided into four transmission sub-channels, which are respectively a transmission sub-channel 1 (including the sub-carriers 1-4), a transmission sub-channel 2 (including sub-carriers 5-8), a transmission sub-channel 3 (including sub-carriers 9-12) and a transmission sub-channel 4 (including sub-carriers 13-16), SINR values of each transmitting end device on the transmission sub-channels (for instance, which may be an average value of SINR values on corresponding sub-carriers included in a transmission sub-channel) and a result of transmission sub-channel allocation may be illustrated as shown in Table 2:

TABLE 2

|  | Transmitting end device 1 | Transmitting end device 2 | Transmitting end device 3 | Transmitting end device 4 | Result of transmission sub-channel allocation |
|---|---|---|---|---|---|
| Transmission sub-channel 1 | 13.5 dB | 7.88 dB | 7.38 dB | 9 dB | Transmitting end device 1 |
| Transmission sub-channel 2 | 11.75 dB | 15 dB | 12.13 dB | 6.5 dB | Transmitting end device 2 |
| Transmission sub-channel 3 | 10.75 dB | 12.63 dB | 15.75 dB | 10 dB | Transmitting end device 3 |
| Transmission sub-channel 4 | 7 dB | 6.5 dB | 10.5 dB | 14.25 dB | Transmitting end device 4 |

It can be seen from Table 2 that, the SINR value (13.5 dB) of the transmitting end device 1 on the transmission sub-channel 1 is a maximum value in the SINR values of the transmitting end device 1 on all transmission sub-channels, furthermore, the SINR values of other transmitting end devices on the transmission sub-channel 1 are less than 13.5 dB. The receiving end device may allocate the transmission sub-channel 1 to the transmitting end device 1. Similarly, the SINR value (15 dB) of the transmitting end device 2 on the transmission sub-channel 2 is a maximum value in the SINR values of the transmitting end device 2 on all channels transmission sub-channels 2, furthermore, the SINR values of other transmitting end devices on the transmission sub-channel are less than 15 dB. The receiving end device may allocate the transmission sub-channel 2 to the transmitting end device 2. The SINR value (15.75 dB) of the transmitting end device 3 on the transmission sub-channel 3 is a maximum value in the SINR values of the transmitting end device 3 on all channels transmission sub-channels, furthermore, the SINR values of other transmitting end devices on the transmission sub-channel 3 are less than 15.75 dB. The receiving end device may allocate the transmission sub-channel 3 to the transmitting end device 3. The SINR value (14.25 dB) of the transmitting end device 4 on the transmission sub-channel 4 is a maximum value in the SINR values of the transmitting end device 4 on all channels transmission sub-channels, furthermore, the SINR values of other transmitting end devices on the transmission sub-channel 4 are less than 14.25 dB. The receiving end device may allocate the transmission sub-channel 4 to the transmitting end device 4.

It should be understood that, embodiments of the present invention will not make a limitation to a dividing approach for transmission sub-channels and how a receiving end device allocates a transmission sub-channel.

Step 404, the receiving end device transmits a scheduling frame to each transmitting end device, where the scheduling frame includes the result of transmission sub-channels allocation in step 403

Optionally, the scheduling frame may be transmitted on the sixteen sub-carriers described above. The scheduling frame may be transmitted to each transmitting end device in a form of broadcasting.

Step 405, each transmitting end device transmits a data frame to the receiving end device.

After each transmitting end device receives the scheduling frame transmitted by the receiving end device in step 404 and acquires allocation information about the transmission sub-channels, correspondingly, the transmitting end device 1 transmits a data frame 1 on the transmission sub-channel 1, the transmitting end device 2 transmits a data frame 2 on the transmission sub-channel 2, the transmitting end device 3 transmits a data frame 3 on the transmission sub-channel 3, and the transmitting end device 4 transmits a data frame 4 on the transmission sub-channel 4.

Thus, in the embodiment of the present invention, a plurality of non-consecutive sub-carriers are included in a same discrete sub-channel, a transmitting end device transmits a contention request frame to a receiving end device on the discrete sub-channel to enable the receiving end device to acquire full band channel state information about the transmitting end device according to the contention request frame, and hence, when transmission sub-channel allocation is performed, channel resources can be better utilized, thereby improving a throughput rate of the system, and achieving a multi-user selection gain.

Figure 6:
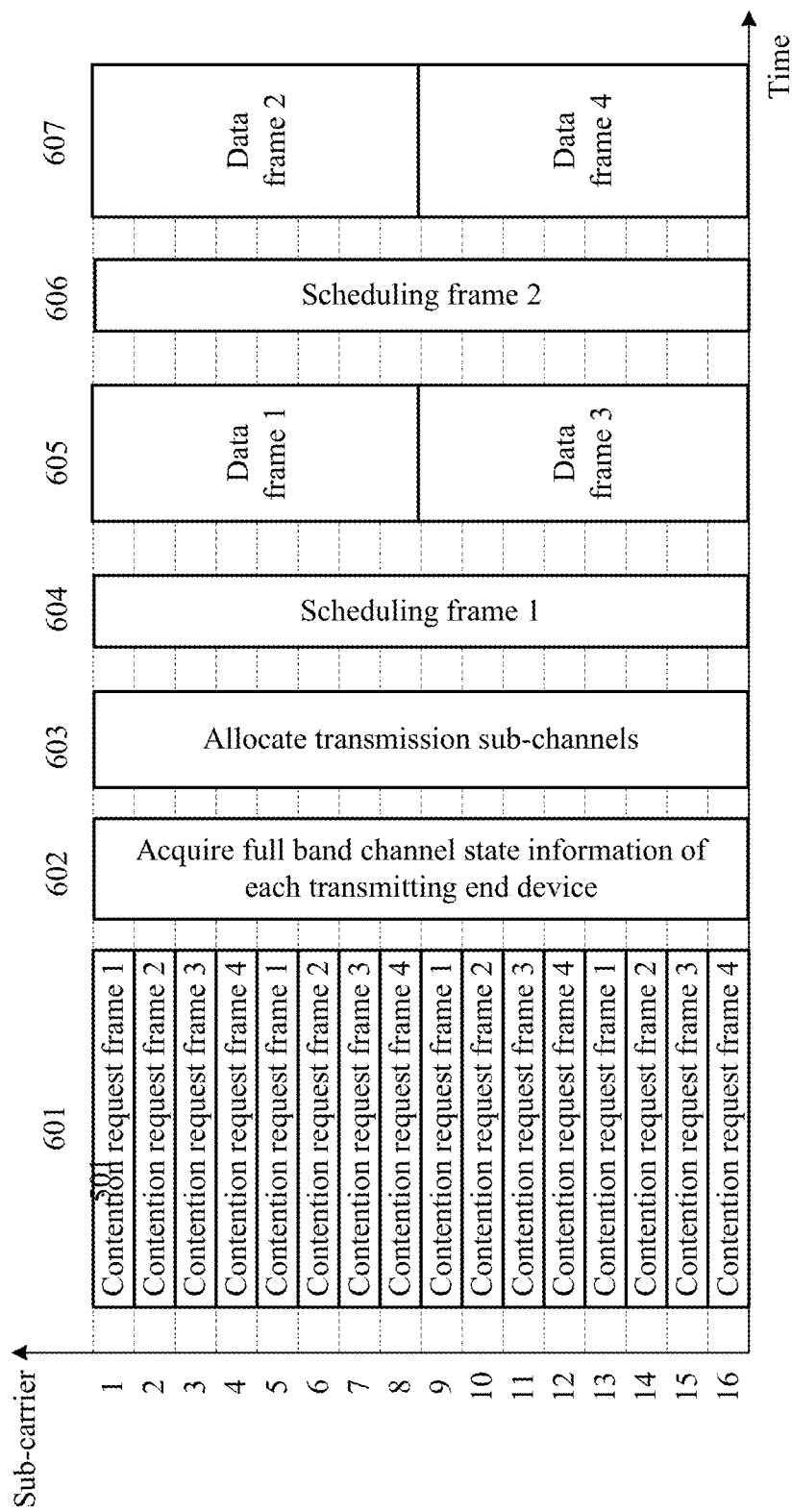
FIG. 6 is a flow chart of a process of a method for accessing a channel according to another embodiment of the present invention.
Figure 7:
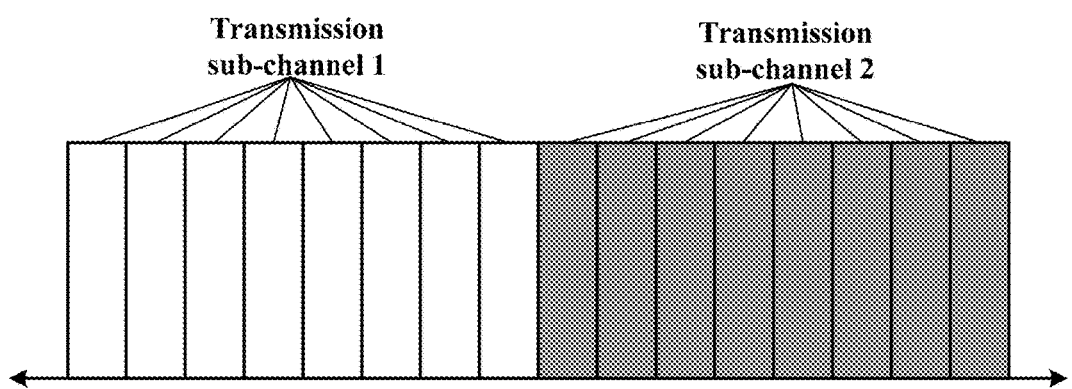
FIG. 7 is a schematic diagram of dividing channel resources by transmission sub-channels according to another embodiment of the present invention.

In an example as shown in FIG. 6, assuming that there are totally sixteen sub-carriers available in a network, FIG. 2 is taken as an example for division of discrete sub-channels, FIG. 7 is taken as an example for division of transmission sub-channels, the channel state information is an SINR, and a scenario where four transmitting end devices need to transmit data frames to one receiving end device is taken as an example, it should be understood that, embodiments of the present invention will not be limited thereto. In the schematic diagram of FIG. 6, a step which is the same as or similar to FIG. 4 uses a same reference numeral, to avoid redundancy, which will not be repeated herein.

Step 602, the receiving end device measures full band channel state information of the four transmitting end devices according to the four contention request frames received.

SINR values of the transmitting end devices 1-4 on respective sub-carriers are as shown in Table 1 above. Reference may be made to the embodiment as shown in FIG. 5 for a manner in which the receiving end device acquires the SINR values of the transmitting end devices 1-4 on every sub-carriers, which will not be repeated herein.

Step 603, the receiving end device allocates transmission sub-channels according to the SINR values of each transmitting end device as acquired in step 602. Taking a dividing approach for transmission channel in FIG. 7 as an example, sixteen sub-carriers are divided into two transmission sub-channels, which are respectively a transmission sub-channel 1 (including sub-carriers 1-8) and a transmission sub-channel 2 (including sub-carriers 9-16), an SINR value of each transmitting end device on a corresponding transmission sub-channel (for instance, which may be an average value of SINR values on corresponding sub-carriers included in a transmission sub-channel) and a result of transmission sub-channel allocation may be illustrated as shown in Table 3 and Table 4:

TABLE 3

|  | Transmitting end device 1 | Transmitting end device 3 | Result of transmission sub-channel allocation |
|---|---|---|---|
| Transmission sub-channel 1 | 12.63 dB | 9.75 dB | Transmitting end device 1 |
| Transmission sub-channel 2 | 8.88 dB | 13.13 dB | Transmitting end device 3 |

TABLE 4

|  | Transmitting end device 2 | Transmitting end device 4 | Result of transmission sub-channel allocation |
|---|---|---|---|
| Transmission sub-channel 1 | 11.44 dB | 7.75 dB | Transmitting end device 2 |
| Transmission sub-channel 2 | 9.56 dB | 12.13 dB | Transmitting end device 4 |

It can be seen from Table 3 and Table 4 that, the SINR value (12.63 dB) of the transmitting end device 1 on the transmission sub-channel 1 is a maximum value in the SINR values of the transmitting end device 1 on all channels transmission sub-channels, and the SINR value (11.44 dB) of the transmitting end device 2 on the transmission sub-channel 1 is a maximum value in the SINR values of the transmitting end device 2 on all channels transmission sub-channels. The SINR value (13.13 dB) of the transmitting end device 3 on the transmission sub-channel 2 is a maximum value in the SINR values of the transmitting end device 3 on all channels transmission sub-channels, and the SINR value (12.13 dB) of the transmitting end device 4 on the transmission sub-channel 2 is a maximum value in the SINR values of the transmitting end device 4 on all channels transmission sub-channels. Optionally, the receiving end device may first allocate the transmission sub-channel 1 to the transmitting end device 1, and then, after a certain period of time, allocate the transmission sub-channel 1 to the transmitting end device 2. Similarly the receiving end device may first allocate the transmission sub-channel 2 to the transmitting end device 3, and then, after a certain period of time, allocate the transmission sub-channel 2 to the transmitting end device 4.

It should be understood that, embodiments of the present invention will not make a limitation to a dividing approach for transmission sub-channels and how a receiving end device allocates a transmission sub-channel.

Step 604, the receiving end device transmits a scheduling frame 1 to each transmitting end device. The scheduling frame 1 includes the result of transmission sub-channel allocation performed by the receiving end device to the transmitting end device 1 and the transmitting end device 3 in step 603.

Step 605, the transmitting end device 1 and the transmitting end device 3 transmit data frames to the receiving end device.

After the transmitting end device 1 and the transmitting end device 3 receive the scheduling frame 1 transmitted by the receiving end device in step 604, and acquire allocation information about the transmission sub-channels, correspondingly, the transmitting end device 1 transmits a data frame 1 on the transmission sub-channel 1, and the transmitting end device 3 transmits a data frame 3 on the transmission sub-channel 2.

Step 606, the receiving end device transmits a scheduling frame 2 to each transmitting end device. The scheduling frame 2 includes the result of transmission sub-channel allocation performed by the receiving end device to the transmitting end device 2 and the transmitting end device 4 in step 603.

Step 607, the transmitting end device 2 and the transmitting end device 4 transmit data frames to the receiving end device.

After the transmitting end device 2 and the transmitting end device 4 receive the scheduling frame 2 transmitted by the receiving end device in step 606, and acquire allocation information about the transmission sub-channels, correspondingly, the transmitting end device 2 transmits a data frame 2 on the transmission sub-channel 1, the transmitting end device 4 transmits a data frame 4 on the transmission sub-channel 2.

Thus, in the embodiment of the present invention, a plurality of non-consecutive sub-carriers are included in a same discrete sub-channel, a transmitting end device transmits a contention request frame to a receiving end device on the discrete sub-channel to enable the receiving end device to acquire full band channel state information about the transmitting end device according to the contention request frame, and hence, when transmission sub-channel allocation is performed, channel resources can be better utilized, thereby improving a throughput rate of the system, and achieving a multi-user selection gain.

Figure 8:
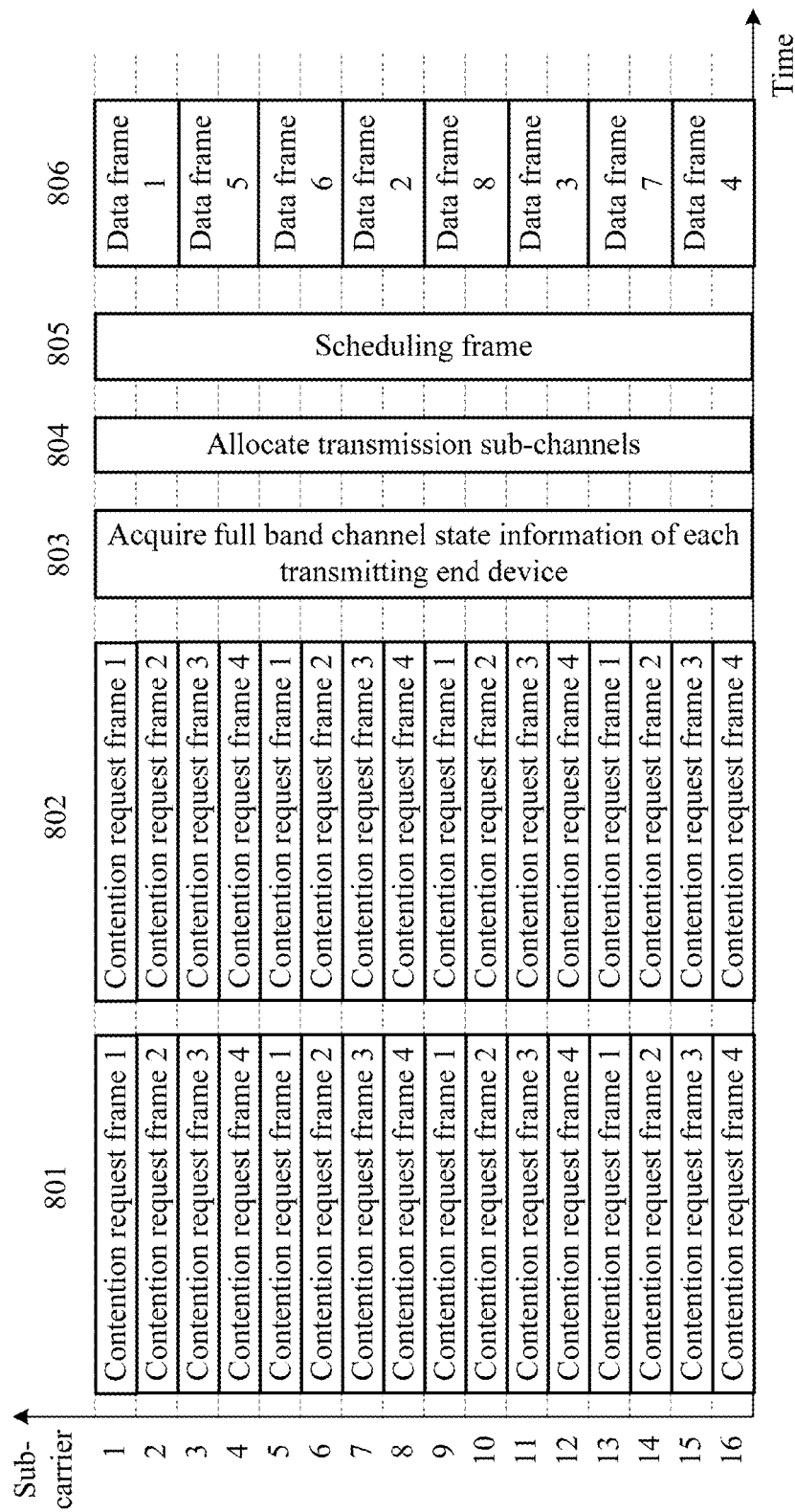
FIG. 8 is a flow chart of a process of a method for accessing a channel according to still another embodiment of the present invention.
Figure 9:
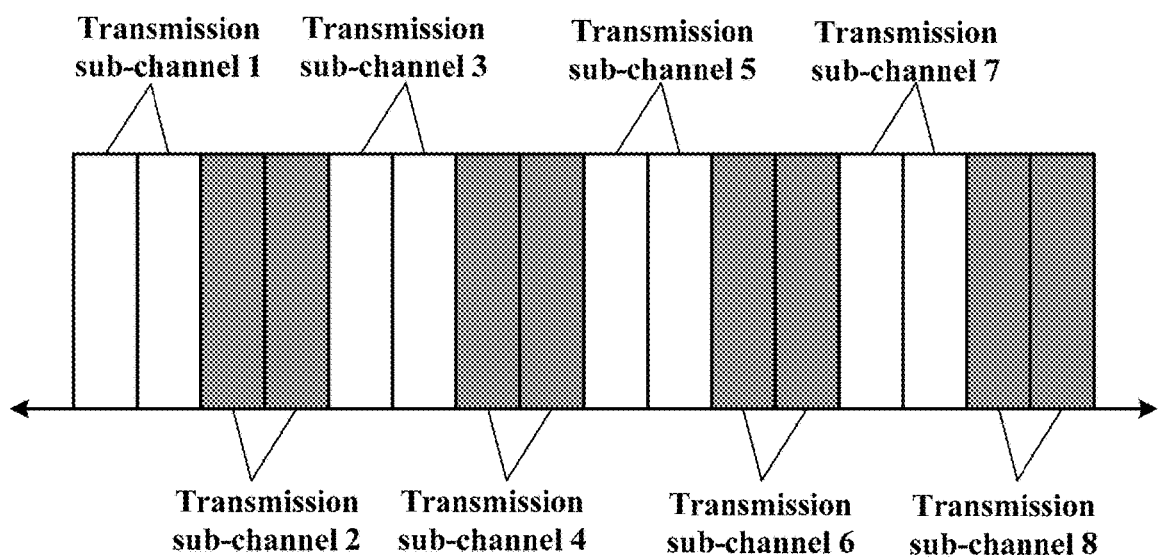
FIG. 9 is a schematic diagram of dividing channel resources by transmission sub-channels according to still another embodiment of the present invention.

In an example as shown in FIG. 8, for ease of description, assuming that there are totally sixteen sub-carriers available in a network, FIG. 2 is taken as an example for division of discrete sub-channels, FIG. 9 is taken as an example for division of transmission sub-channels, the channel state information is an SINR, and a scenario where eight transmitting end devices (transmitting end devices 1-8) need to transmit data frames to one receiving end device is taken as an example, it should be understood that, embodiments of the present invention will not be limited thereto.

Step 801, transmitting end devices 1-4 select discrete sub-channels to transmit contention request frames to the receiving end device.

A transmitting end device 1 selects a discrete sub-channel 1 (including a sub-carrier 1, a sub-carrier 5, a sub-carrier 9 and a sub-carrier 13) to transmit a contention request frame 1; a transmitting end device 2 selects a discrete sub-channel 2 (including a sub-carrier 2, a sub-carrier 6, a sub-carrier 10 and a sub-carrier 14) to transmit a contention request frame 2; a transmitting end device 3 selects a discrete sub-channel 3 (including a sub-carrier 3, a sub-carrier 7, a sub-carrier 11 and a sub-carrier 15) to transmit a contention request frame 3; and a transmitting end device 4 selects a discrete sub-channel 4 (including a sub-carrier 4, a sub-carrier 8, a sub-carrier 12 and a sub-carrier 16) to transmit a contention request frame 4.

Step 802, transmitting end devices 5-8 select discrete sub-channels to transmit contention request frames to the receiving end device.

A transmitting end device 5 selects the discrete sub-channel 1 (including the sub-carrier 1, the sub-carrier 5, the sub-carrier 9 and the sub-carrier 13) to transmit a contention request frame 5; a transmitting end device 6 selects the discrete sub-channel 2 (including the sub-carrier 2, the sub-carrier 6, the sub-carrier 10 and the sub-carrier 14) to transmit a contention request frame 6; a transmitting end device 7 selects the discrete sub-channel 3 (including the sub-carrier 3, the sub-carrier 7, the sub-carrier 11 and the sub-carrier 15) to transmit a contention request frame 7; and a transmitting end device 8 selects the discrete sub-channel 4 (including the sub-carrier 4, the sub-carrier 8, the sub-carrier 12 and the sub-carrier 16) to transmit a contention request frame 8.

When a plurality of transmitting end devices transmit contention request frames on a same discrete sub-channel, since the discrete sub-channel only allows one transmitting end device to transmit a contention request frame, there may be a case where the contention request frame fails to be transmitted on the transmitting end device, the transmitting end device may transmit the contention request frame multiple times. For instance, both the transmitting end device 1 and the transmitting end device 5 select the discrete sub-channel 1 and transmit contention request frames to the receiving end device simultaneously, the transmitting end device 1 succeeds in transmitting the contention request frame on the discrete sub-channel 1 (step 801), the transmitting end device 5 fails to transmit the contention request frame, and may transmit the contention request frame on the discrete sub-channel 1 again (step 802).

It should be noted that, descriptions on a corresponding relation among a serial number of a transmitting end device, a serial number of a contention request frame, a serial number of a sub-carrier and a serial number of a discrete sub-channel are merely intended for helping those skilled in the art to understood, rather than limiting the scope of the present invention, for instance, the transmitting end device 1 may also select other discrete sub-channels apart from the discrete sub-channel 1 to transmit the contention request frame, and a specific location of a sub-carrier included in a discrete sub-channel is not limited either.

Step 803, the receiving end device measures full band channel state information of the eight transmitting end devices according to the eight contention request frames received.

Reference may be made to the embodiment as shown in FIG. 4 for an approach that the receiving end device acquires SINR values of the transmitting end devices 1-8 on each sub-carrier, which will not be repeated herein.

Step 804, the receiving end device allocates transmission sub-channels according to the SINR values of the transmitting end devices as acquired in step 803, taking a dividing approach for transmission sub-channels in FIG. 9 as an example, sixteen sub-carriers are divided into eight transmission sub-channels, which are respectively a transmission sub-channel 1 (including sub-carriers 1-2), a transmission sub-channel 2 (including sub-carriers 3-4), a transmission sub-channel 3 (including sub-carriers 5-6), a transmission sub-channel 4 (including sub-carriers 7-8), a transmission sub-channel 5 (including sub-carriers 9-10), a transmission sub-channel 6 (including sub-carriers 11-12), a transmission sub-channel 7 (including sub-carriers 13-14) and a transmission sub-channel 8 (including sub-carriers 15-16), an SINR value of each transmitting end device on a corresponding transmission sub-channel and a result of transmission sub-channel allocation may be illustrated as shown in Table 5:

TABLE 5

|  | Transmitting end device 1 | Transmitting end device 2 | Transmitting end device 3 | Transmitting end device 4 | Transmitting end device 5 | Transmitting end device 6 | Transmitting end device 7 | Transmitting end device 8 | Result of transmission sub-channel allocation |
|---|---|---|---|---|---|---|---|---|---|
| Transmission sub-channel 1 | 14.5 dB | 6 dB | 7 dB | 9 dB | 7.5 dB | 11.25 dB | 9 dB | 8.5 dB | Transmitting end device 1 |
| Transmission sub-channel 2 | 12.5 dB | 9.75 dB | 7.75 dB | 9 dB | 14.75 dB | 12 dB | 8.75 dB | 6 dB | Transmitting end device 5 |
| Transmission sub-channel 3 | 11.25 dB | 14.75 dB | 10.75 dB | 7.5 dB | 12.5 dB | 15.25 dB | 13.25 dB | 9.75 dB | Transmitting end device 6 |
| Transmission sub-channel 4 | 12.25 dB | 15.25 dB | 13.5 dB | 5.5 dB | 8.5 dB | 13.25 dB | 12.5 dB | 11 dB | Transmitting end device 2 |
| Transmission sub-channel 5 | 12.25 dB | 14.25 dB | 15.5 dB | 8 dB | 6.5 dB | 10.75 dB | 13 dB | 16.5 dB | Transmitting end device 8 |
| Transmission sub-channel 6 | 9.25 dB | 11 dB | 16 dB | 12 dB | 8.25 dB | 8.25 dB | 13.5 dB | 13.5 dB | Transmitting end device 3 |
| Transmission sub-channel 7 | 7 dB | 7 dB | 12 dB | 13.75 dB | 9.5 dB | 7.5 dB | 16.5 dB | 10 dB | Transmitting end device 7 |
| Transmission sub-channel 8 | 7 dB | 6 dB | 9 dB | 14.75 dB | 11.5 dB | 6 dB | 12.25 dB | 8.5 dB | Transmitting end device 4 |

It can be seen from Table 5 that, the SINR value (14.5 dB) of the transmitting end device 1 on the transmission sub-channel 1 is a maximum value in the SINR values of the transmitting end device 1 on all channels transmission sub-channels, furthermore, the SINR values of other transmitting end devices on the transmission sub-channel 1 are less than 14.5 dB. The receiving end device may allocate the transmission sub-channel 1 to the transmitting end device 1. The SINR value (14.75 dB) of the transmitting end device 5 on the transmission sub-channel 2 is a maximum value in the SINR values of the transmitting end device 5 on all channels transmission sub-channels 2, furthermore, the SINR values of other transmitting end devices on the transmission sub-channel 2 are less than 14.75 dB. The receiving end device may allocate the transmission sub-channel 2 to the transmitting end device 5. Similarly, the receiving end device may allocate the transmission sub-channel 3 to the transmitting end device 6, allocate the transmission sub-channel 4 to the transmitting end device 2, allocate the transmission sub-channel 5 to the transmitting end device 8, allocate the transmission sub-channel 6 to the transmitting end device 3, allocate the transmission sub-channel 7 to the transmitting end device 7, and allocate the transmission sub-channel 8 to the transmitting end device 4. Reference may be made to above descriptions for a specific example where the receiving end device allocates transmission sub-channels, which will not be repeated herein.

It should be understood that, embodiments of the present invention will not make a limitation to a dividing approach for transmission sub-channels and how a receiving end device allocates a transmission sub-channel.

Step 805, the receiving end device transmits a scheduling frame to each transmitting end device. The scheduling frame includes the result of transmission sub-channel allocation performed by the receiving end device to the transmitting end devices 1-8 in step 803.

Optionally, the scheduling frame may be transmitted on the sixteen sub-carriers described above. The scheduling frame may be transmitted to each transmitting end device in a form of broadcasting.

Step 806, the transmitting end devices 1-8 transmit data frames to the receiving end device.

After the transmitting end devices 1-8 receive scheduling frames transmitted by the receiving end device in step 805 and acquire allocation information about the transmission sub-channels, correspondingly, the transmitting end device 1 transmits a data frame 1 on the transmission sub-channel 1, the transmitting end device 5 transmits a data frame 5 on the transmission sub-channel 2, the transmitting end device 6 transmits a data frame 6 on the transmission sub-channel 3, the transmitting end device 2 transmits a data frame 2 on the transmission sub-channel 4, the transmitting end device 8 transmits a data frame 8 on the transmission sub-channel 5, the transmitting end device 3 transmits a data frame 3 on the transmission sub-channel 6, the transmitting end device 7 transmits a data frame 7 on the transmission sub-channel 7, and the transmitting end device 4 transmits a data frame 4 on the transmission sub-channel 8.

Thus, in the embodiment of the present invention, a plurality of non-consecutive sub-carriers are included in a same discrete sub-channel, a transmitting end device transmits a contention request frame to a receiving end device on the discrete sub-channel to enable the receiving end device to acquire full band channel state information about the transmitting end device according to the contention request frame, and hence, when transmission sub-channel allocation is performed, channel resources can be better utilized, thereby improving a throughput rate of the system, and achieving a multi-user selection gain.

It should be noted that, a value of SINR of channel state information in the above examples is merely exemplary, rather than intended for limiting the scope of the present invention. Moreover, in the above examples, a transmission sub-channel includes a plurality of consecutive sub-carriers, and it should be understood that, embodiments of the present invention will not be limited thereto; the transmission sub-channel may also include a plurality of non-consecutive sub-carriers, and may also only include one sub-carrier.

Figure 10:
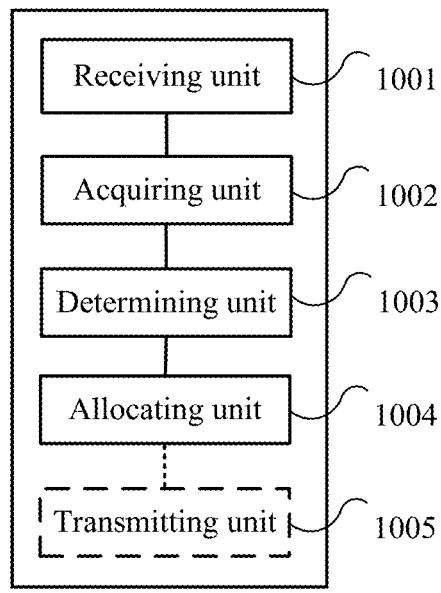
FIG. 10 is a schematic structural diagram of a receiving end device according to an embodiment of the present invention.

FIG. 10 is a schematic structural diagram of a receiving end device according to an embodiment of the present invention. The receiving end device 1000 in FIG. 10 includes a receiving unit 1001, an acquiring unit 1002, a determining unit 1003 and an allocating unit 1004.

The receiving unit 1001 is configured to receive a contention request frame transmitted by a first transmitting end device on M sub-carriers, where the M sub-carriers at least have two non-consecutive sub-carriers, and the contention request frame is modulated by the first transmitting end device onto the M sub-carriers.

The acquiring unit 1002 is configured to acquire, according to the contention request frame received by the receiving unit 1001, channel state information about the first transmitting end device respectively on the M sub-carriers.

The determining unit 1003 is configured to determine, according to the channel state information about the first transmitting end device respectively on the M sub-carriers acquired by the acquiring unit 1002, channel state information about the first transmitting end device respectively on N sub-carriers, where the N sub-carriers are obtained by dividing all or a part of a system available frequency band, the N sub-carriers include the M sub-carriers, both N and M are positive integers, N>M and M>1.

The allocating unit 1004 is configured to perform allocation of a transmission sub-channel according to the channel state information about the first transmitting end device respectively on the N sub-carriers determined by the determining unit 1003.

In the embodiment of the present invention, a receiving end device receives a contention request frame transmitted by a first transmitting end device on M sub-carriers, where the M sub-carriers at least have two non-consecutive sub-carriers, and acquires, according to the contention request frame modulated by the first transmitting end device onto the M sub-carriers, channel state information about the first transmitting end device respectively on a plurality of sub-carriers so as to determine channel state information about the first transmitting end device on N sub-carriers obtained by dividing all or a part of a system available frequency band and perform transmission sub-channel allocation. The N sub-carriers include the M sub-carriers, both N and M are positive integers, N>M and M>1. In an existing mechanism, the receiving end device acquires channel state information about the first transmitting end device within a certain consecutive frequency band range, and the channel state information about the first transmitting end device within the certain consecutive frequency band range is similar, and thus the channel state information about the first transmitting end device acquired by the receiving end device is incomplete and limited, which results in that channel resources cannot be effectively utilized when transmission sub-channel allocation is performed. However, the embodiment of the present invention enables the receiving end device to acquire full band channel state information by using a plurality of non-consecutive sub-carriers, and effectively utilize the channel resources when performing transmission sub-channel allocation, thereby increasing a throughput rate of the system, and achieving a multi-user selection gain.

The receiving end device 1000 may perform each step related to the receiving end device in the method as shown in FIG. 1 to FIG. 8, which will not be repeated herein to avoid redundancy.

It should be noted that, the full band herein indicates all or a part of a system available frequency band, that is, the full band is divided into the N sub-carriers described above, and it should be understood that, the embodiment of the present invention will not limit bandwidth size of the full band.

In the embodiment of the present invention, the sub-channel formed by the above M sub-carriers is called as a discrete sub-channel, the N sub-carriers may be divided into one or more discrete sub-channels, the number of sub-carriers included in different discrete sub-channels may be the same or different, and different transmitting end devices may transmit contention request frames on different discrete sub-channels.

Optionally, a spacing between center frequency points of two adjacent sub-carriers in the M sub-carriers may be less than or equal to coherence bandwidth.

Specifically, when the M sub-carriers include a sub-carrier with a lowest frequency point and a sub-carrier with a highest frequency point in the N sub-carriers, a spacing (an interval) between center frequency points of two adjacent sub-carriers in the M sub-carriers is less than or equal to the coherence bandwidth.

Or, when the M sub-carriers include a sub-carrier with a lowest frequency point in the N sub-carriers but do not include a sub-carrier with a highest frequency point in the N sub-carriers, a spacing between center frequency points of two adjacent sub-carriers in the M sub-carriers is less than or equal to the coherence bandwidth, and a spacing between center frequency points of a sub-carrier with a highest frequency point in the M sub-carriers and the sub-carrier with the highest frequency point in the N sub-carriers is less than or equal to the coherence bandwidth.

Or, when the M sub-carriers include a sub-carrier with a highest frequency point in the N sub-carriers but do not include a sub-carrier with a lowest frequency point in the N sub-carriers, a spacing between center frequency points of two adjacent sub-carriers in the M sub-carriers is less than or equal to the coherence bandwidth, and a spacing between center frequency points of a sub-carrier with a lowest frequency point in the M sub-carriers and the sub-carrier with the lowest frequency point in the N sub-carriers is less than or equal to the coherence bandwidth.

Or, when the M sub-carriers neither include a sub-carrier with a highest frequency point in the N sub-carriers nor include a sub-carrier with a lowest frequency point in the N sub-carriers, a spacing between center frequency points of two adjacent sub-carriers in the M sub-carriers is less than or equal to the coherence bandwidth, a spacing between center frequency points of a sub-carrier with a lowest frequency point in the M sub-carriers and the sub-carrier with the lowest frequency point in the N sub-carriers is less than or equal to the coherence bandwidth, and a spacing between center frequency points of the sub-carrier with the highest frequency point in the M sub-carriers and the sub-carrier with the highest frequency point in the N sub-carriers is less than or equal to the coherence bandwidth.

Optionally, design information about the above discrete sub-channels (i.e. information about the N sub-carriers being divided into one or more discrete sub-channels) may be pre-agreed by a receiving end device and a transmitting end device, and design of the discrete sub-channels may also be performed by a network side device (such as the above receiving end device), the design information about the discrete sub-channels is transmitted to a plurality of transmitting end devices in a form of broadcasting, and the first transmitting end device is any one of the plurality of the transmitting end devices. It should be understood that, the embodiment of the present invention will not make a limitation. The first transmitting end device may select a discrete sub-channel from the plurality of discrete sub-channels according to the design information about the discrete sub-channels and transmit the contention request frame.

Optionally, the channel state information may include at least one of: a channel matrix H, an SINR, an SNR, a CQI, etc., it should be understood that, the embodiment of the present invention will not be limited thereto.

Optionally, as an embodiment, the determining unit 1003 is specifically configured to: determine, according to the channel state information about the first transmitting end device respectively on the M sub-carriers, and based on a principle of coherence bandwidth, the channel state information about the first transmitting end device respectively on the N sub-carriers.

Specifically, channel state information about the first transmitting end device respectively on a plurality of sub-carriers within the coherence bandwidth may be deemed as approximately equal, and may be obtained via channel state information about the first transmitting end device corresponding to a neighboring sub-carrier on the discrete sub-channel (for instance, equal to the channel state information corresponding to the neighboring sub-carrier); or, may be obtained by interpolation (such as linear interpolation) of channel state information about the first transmitting end device respectively corresponding to two non-consecutive sub-carriers adjacent on a same discrete sub-channel, and it should be understood that, an embodiment of the present invention will not be limited thereto. Reference may be made to the above descriptions for a specific embodiment, which will not be repeated herein.

According to the above solution, in a case where an interval between center frequency points of two adjacent sub-carriers in a plurality of non-consecutive sub-carriers on a discrete sub-channel is less than or equal to coherence bandwidth, the receiving end device may acquire full band channel state information about the first transmitting end device based on the principle of coherence bandwidth, and similarly, the receiving end device may also acquire full band channel state information about other transmitting end devices. In this way, the receiving end device selects a transmission sub-channel used for data transmission for the transmitting end device based on the full band channel state information about the transmitting end device, channel resources can be effectively utilized, thereby increasing a throughput rate of the system, and achieving a multi-user selection gain.

Optionally, as another embodiment, the determining unit 1003 may be further configured to: determine values of channel state information about the first transmitting end device on all transmission sub-channels according to the channel state information about the first transmitting end device respectively on the N sub-carriers. The allocating unit 1004 may be specifically configured to: perform the allocation of the transmission sub-channel according to the values of the channel state information about the first transmitting end device on all transmission sub-channels.

Furthermore, the allocating unit 1004 is specifically configured to: when a value of channel state information about the first transmitting end device on a first transmission sub-channel is a maximum value in the values of the channel state information about the first transmitting end device on all transmission sub-channels, allocate the first transmission sub-channel to the first transmitting end device.

Or, the allocating unit 1004 is specifically configured to: when a value of channel state information about the first transmitting end device on a second transmission sub-channel is less than a value of channel state information about a second transmitting end device on the second transmission sub-channel, allocate the second transmission sub-channel to the second transmitting end device. Furthermore, the allocating unit 1004 may also be configured to: after a certain period of time, allocate the second transmission sub-channel to the first transmitting end device.

The receiving end device 1000 may also include a transmitting unit 1005, and the transmitting unit 1005 is configured to transmit a scheduling frame to the first transmitting end device, where the scheduling frame includes the allocation of the transmission sub-channel, so that the first transmitting end device transmits data on a corresponding transmission sub-channel according to the scheduling frame.

It should be noted that, the embodiment of the present invention will not make a limitation to a design approach for transmission sub-channels either, a transmission sub-channel may include a plurality of consecutive sub-carriers, may also include a plurality of non-consecutive sub-carriers, and may also include only one sub-carrier. Optionally, a value of channel state information about a transmitting end device on a certain transmission sub-channel may be an average value of channel state information about the transmitting end device on all sub-carriers of the transmission sub-channel.

It should be understood that, the embodiment of the present invention will not make a limitation to how a receiving end device performs transmission sub-channel allocation according to channel state information.

It should be noted that, after a receiving end device receives a contention request frame transmitted by a transmitting end device, the receiving end device may transmit a scheduling frame to the transmitting end device multiple times, as described in the above example, the receiving end device first allocates a transmission sub-channel to a second transmitting end device and transmits the scheduling frame to a plurality of transmitting end devices in a form of broadcasting, and after a certain period of time, allocates the transmission sub-channel to a first transmitting end device, and then transmits the scheduling frame to a plurality of transmitting end devices in a form of broadcasting. The embodiment of the present invention will not limit the times the receiving end device transmits the scheduling frame.

It should also be noted that, when a plurality of transmitting end devices transmit contention request frames on a same discrete sub-channel, since the discrete sub-channel only allows one transmitting end device to transmit a contention request frame, there may be a case where the contention request frame fails to be transmitted on the transmitting end device, the transmitting end device may transmit the contention request frame multiple times. The embodiment of the present invention will not limit the times the transmitting end device transmits the contention request frame.

Figure 11:
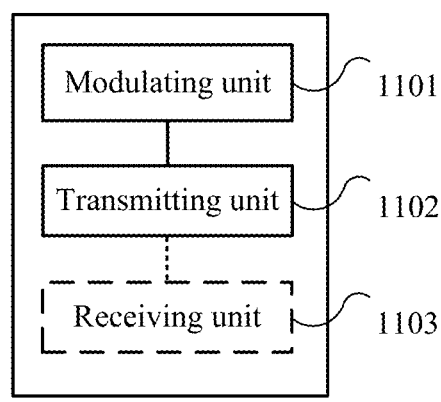
FIG. 11 is a schematic structural diagram of a transmitting end device according to an embodiment of the present invention.

FIG. 11 is a schematic structural diagram of a transmitting end device according to an embodiment of the present invention. The transmitting end device 1100 in FIG. 11 includes a modulating unit 1101 and a transmitting unit 1102.

The modulating unit 1101 is configured to modulate a contention request frame onto M sub-carriers, where the M sub-carriers at least have two non-consecutive sub-carriers.

The transmitting unit 1102 is configured to transmit the contention request frame modulated by the modulating unit 1101 to a receiving end device on the M sub-carriers, so that the receiving end device acquires channel state information about the first transmitting end device respectively on the M sub-carriers according to the contention request frame, determines, according to the channel state information about the first transmitting end device respectively on the M sub-carriers, channel state information about the first transmitting end device respectively on N sub-carriers, where the N sub-carriers are obtained by dividing all or a part of a system available frequency band, the N sub-carriers include the M sub-carriers, both N and M are positive integers, N>M and M>1, and performs allocation of a transmission sub-channel according to the channel state information about the first transmitting end device respectively on the N sub-carriers.

In the embodiment of the present invention, a first transmitting end device modulates a contention request frame onto M sub-carriers, and transmits the contention request frame to a receiving end device on the M sub-carriers, where the M sub-carriers at least have two non-consecutive sub-carriers. In this way, the receiving end device acquires channel state information about the first transmitting end device respectively on a plurality of sub-carriers through the contention request frame modulated by the first transmitting end device onto the M sub-carriers so as to determine channel state information about the first transmitting end device on N sub-carriers obtained by dividing all or a part of a system available frequency band and perform transmission sub-channel allocation. The N sub-carriers include the M sub-carriers, both N and M are positive integers, N>M and M>1. Thus, the embodiment of the present invention enables the receiving end device to acquire full band channel state information by using a plurality of non-consecutive sub-carriers and effectively utilize channel resources when performing transmission sub-channel allocation, thereby increasing a throughput rate of the system, and achieving a multi-user selection gain.

It should be noted that, the full band herein indicates all or a part of a system available frequency band, that is, the full band is divided into the N sub-carriers described above, and it should be understood that, the embodiment of the present invention will not limit bandwidth size of the full band.

In the embodiment of the present invention, the sub-channel formed by the above M sub-carriers is called as a discrete sub-channel, the N sub-carriers may be divided into one or more discrete sub-channels, the number of sub-carriers included in different discrete sub-channels may be the same or different, and different transmitting end devices may transmit contention request frames on different discrete sub-channels.

The transmitting end device 1100 may perform each step related to the transmitting end device in the method as shown in FIG. 1 to FIG. 8, which will not be repeated herein to avoid redundancy.

Optionally, as an embodiment, a spacing between center frequency points of two adjacent sub-carriers in the M sub-carriers may be less than or equal to coherence bandwidth. Reference may be made to the above descriptions for a specific embodiment, which will not be repeated herein.

Thus, in a case where an interval between center frequency points of two sub-carriers adjacent in a plurality of non-consecutive sub-carriers on a discrete sub-channel is less than or equal to the coherence bandwidth, the receiving end device may acquire full band channel state information about the first transmitting end device based on a principle of coherence bandwidth. In this way, the receiving end device selects a transmission sub-channel used for data transmission for the transmitting end device based on the full band channel state information about the transmitting end device, and channel resources can be effectively utilized, thereby increasing a throughput rate of the system, and achieving a multi-user selection gain.

Optionally, design information about the above discrete sub-channel may be pre-agreed by a receiving end device and a transmitting end device, and design of the discrete sub-channel may also be performed by a network side device (such as the above receiving end device), the design information about the discrete sub-channel is transmitted to a plurality of transmitting end devices in a form of broadcasting, and the first transmitting end device is any one of the plurality of the transmitting end devices. It should be understood that, the embodiment of the present invention will not make a limitation. The first transmitting end device may select a discrete sub-channel from a plurality of discrete sub-channels according to the design information about the discrete sub-channel and transmit the contention request frame.

Optionally, the channel state information may include at least one of: a channel matrix H, an SINR, an SNR, a CQI, etc., and it should be understood that, the embodiment of the present invention will not be limited thereto.

Optionally, as an embodiment, the transmitting end device 1100 may also include a receiving unit 1103, and the receiving unit 1103 is configured to receive a scheduling frame transmitted by the receiving end device, where the scheduling frame includes allocation of a transmission sub-channel. The transmitting unit 1102 may also be configured to: transmit data on a corresponding transmission sub-channel according to the scheduling frame received by the receiving unit 1103.

It should be noted that, after a receiving end device receives a contention request frame transmitted by a transmitting end device, the receiving end device may transmit a scheduling frame to the transmitting end device multiple times. The embodiment of the present invention will not limit the times the receiving end device transmits the scheduling frame.

It should also be noted that, when a plurality of transmitting end devices transmit contention request frames on a same discrete sub-channel, since the discrete sub-channel only allows one transmitting end device to transmit a contention request frame, there may be a case where the contention request frame fails to be transmitted on the transmitting end device, the transmitting end device may transmit the contention request frame multiple times. The embodiment of the present invention will not limit the times the transmitting end device transmits the contention request frame.

Figure 12:
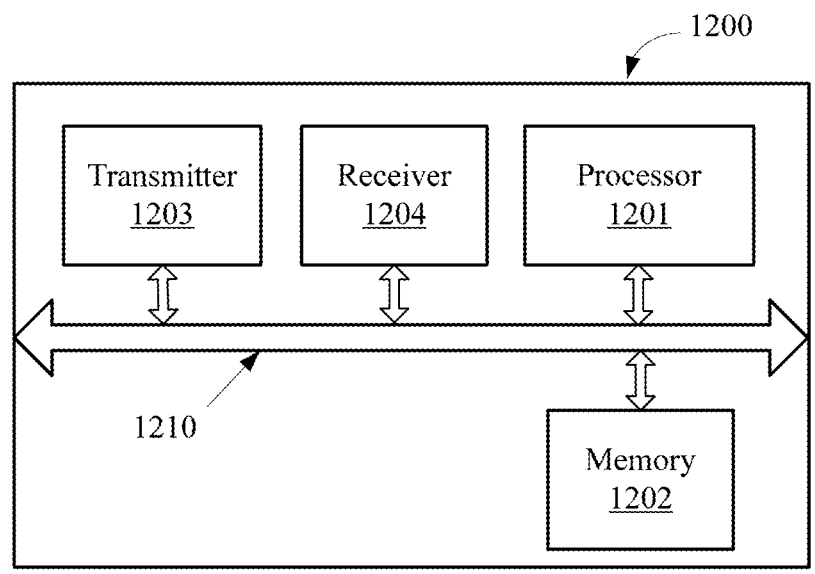
FIG. 12 is a schematic block diagram of a device according to an embodiment of the present invention.

An embodiment of the present invention further provides a device embodiment for implementing steps and methods in the above method embodiments. FIG. 12 shows an embodiment of a device, in this embodiment, the device 1200 includes a processor 1201, a memory 1202, a transmitter 1203 and a receiver 1204. The processor 1201 controls operations of the device 1200, and the processor 1201 may also be referred to as a CPU (Central Processing Unit). The memory 1202 may include a read only memory and a random access memory, and provides instructions and data to the processor 1201. Part of the memory 1202 may also include a non-volatile random access memory (NVRAM). The processor 1201, the memory 1202, the transmitter 1203 and the receiver 1204 are coupled together via a bus system 1210, where the bus system 1210, besides including a data bus, also includes a power bus, a control bus and a status signal bus. However, for a purpose of clear description, the various buses are indicated as the bus system 1210 in the drawing.

A method disclosed in the embodiments of the present invention above may be applied with the device 1200 above described. The processor 1201 may be an integrated circuit chip, which has a capability to process signals. During an implementation process, steps of the above method may be implemented by the integrated logic circuit of hardware in the processor 1201 or be implemented by instructions in a form of software.

Figure 13:
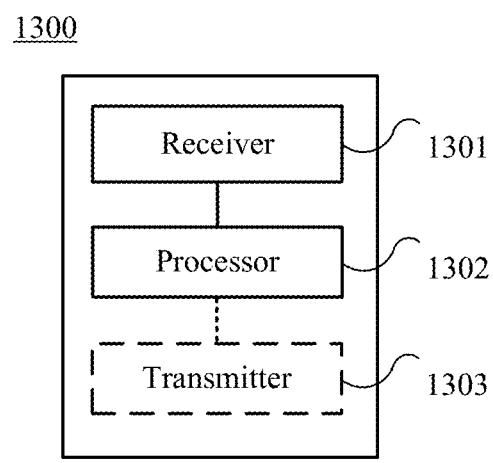
FIG. 13 is a schematic structural diagram of a receiving end device according to another embodiment of the present invention.

FIG. 13 is a schematic structural diagram of a receiving end device according to another embodiment of the present invention. The receiving end device 1300 in FIG. 13 includes a receiver 1301 and a processor 1302.

The receiver 1301 is configured to receive a contention request frame transmitted by a first transmitting end device on M sub-carriers, where the M sub-carriers at least have two non-consecutive sub-carriers, and the contention request frame is modulated by the first transmitting end device onto the M sub-carriers.

The processor 1302 is configured to acquire, according to the contention request frame received by the receiver 1301, channel state information about the first transmitting end device respectively on the M sub-carriers.

The processor 1302 is also configured to determine, according to the acquired channel state information about the first transmitting end device respectively on the M sub-carriers, channel state information about the first transmitting end device respectively on N sub-carriers, where the N sub-carriers are obtained by dividing all or a part of a system available frequency band, the N sub-carriers include the M sub-carriers, both N and M are positive integers, N>M and M>1.

The processor 1302 is also configured to perform allocation of a transmission sub-channel according to the determined channel state information about the first transmitting end device respectively on the N sub-carriers.

In an embodiment of the present invention, a receiving end device receives a contention request frame transmitted by a first transmitting end device on M sub-carriers, where the M sub-carriers at least have two non-consecutive sub-carriers, and acquires, according to the contention request frame modulated by the first transmitting end device onto the M sub-carriers, channel state information about the first transmitting end device respectively on a plurality of sub-carriers so as to determine channel state information about the first transmitting end device on N sub-carriers obtained by dividing all or a part of a system available frequency band and perform transmission sub-channel allocation. The N sub-carriers include the M sub-carriers, both N and M are positive integers, N>M and M>1. In an existing mechanism, the receiving end device acquires channel state information about the first transmitting end device within a certain consecutive frequency band range, and the channel state information about the first transmitting end device within the certain consecutive frequency band range is similar, and thus the channel state information about the first transmitting end device acquired by the receiving end device is incomplete and limited, which results in that channel resources cannot be effectively utilized when transmission sub-channel allocation is performed. However, the embodiment of the present invention enables the receiving end device to acquire full band channel state information by using a plurality of non-consecutive sub-carriers, and effectively utilize the channel resources when performing transmission sub-channel allocation, thereby increasing a throughput rate of the system, and achieving a multi-user selection gain.

The receiving end device 1300 may perform each step related to the receiving end device in the method as shown in FIG. 1 to FIG. 8, which will not be repeated herein to avoid redundancy.

It should be noted that, the full band herein indicates all or a part of a system available frequency band, that is, the full band is divided into the N sub-carriers described above, and it should be understood that, the embodiment of the present invention will not limit bandwidth size of the full band.

In the embodiment of the present invention, the sub-channel formed by the above M sub-carriers is called as a discrete sub-channel, the N sub-carriers may be divided into one or more discrete sub-channels, the number of sub-carriers included in different discrete sub-channels may be the same or different, and different transmitting end devices may transmit contention request frames on different discrete sub-channels.

Optionally, a spacing between center frequency points of two adjacent sub-carriers in the M sub-carriers may be less than or equal to coherence bandwidth.

Specifically, when the M sub-carriers include a sub-carrier with a lowest frequency point and a sub-carrier with a highest frequency point in the N sub-carriers, a spacing (an interval) between center frequency points of two adjacent sub-carriers in the M sub-carriers is less than or equal to the coherence bandwidth.

Or, when the M sub-carriers include a sub-carrier with a lowest frequency point in the N sub-carriers but do not include a sub-carrier with a highest frequency point in the N sub-carriers, a spacing between center frequency points of two adjacent sub-carriers in the M sub-carriers is less than or equal to the coherence bandwidth, and a spacing between center frequency points of a sub-carrier with a highest frequency point in the M sub-carriers and the sub-carrier with the highest frequency point in the N sub-carriers is less than or equal to the coherence bandwidth.

Or, when the M sub-carriers include a sub-carrier with a highest frequency point in the N sub-carriers but do not include a sub-carrier with a lowest frequency point in the N sub-carriers, a spacing between center frequency points of two adjacent sub-carriers in the M sub-carriers is less than or equal to the coherence bandwidth, and a spacing between center frequency points of a sub-carrier with a lowest frequency point in the M sub-carriers and the sub-carrier with the lowest frequency point in the N sub-carriers is less than or equal to the coherence bandwidth.

Or, when the M sub-carriers neither include a sub-carrier with a highest frequency point in the N sub-carriers nor include a sub-carrier with a lowest frequency point in the N sub-carriers, a spacing between center frequency points of two adjacent sub-carriers in the M sub-carriers is less than or equal to the coherence bandwidth, a spacing between center frequency points of a sub-carrier with a lowest frequency point in the M sub-carriers and the sub-carrier with the lowest frequency point in the N sub-carriers is less than or equal to the coherence bandwidth, and a spacing between center frequency points of the sub-carrier with the highest frequency point in the M sub-carriers and the sub-carrier with the highest frequency point in the N sub-carriers is less than or equal to coherence bandwidth.

Optionally, design information about the above discrete sub-channels (i.e. information about the N sub-carriers being divided into one or more discrete sub-channels) may be pre-agreed by a receiving end device and a transmitting end device, and design of the discrete sub-channels may also be performed by a network side device (such as the above receiving end device), the design information about the discrete sub-channels is transmitted to a plurality of transmitting end devices in a form of broadcasting, and the first transmitting end device is any one of the plurality of the transmitting end devices. It should be understood that, the embodiment of the present invention will not make a limitation. The first transmitting end device may select a discrete sub-channel from the plurality of discrete sub-channels according to the design information about the discrete sub-channels and transmit the contention request frame.

Optionally, the channel state information may include at least one of: a channel matrix H, an SINR, an SNR, a CQI, etc., and it should be understood that, the embodiment of the present invention will not be limited thereto.

Optionally, as an embodiment, the processor 1302 is specifically configured to: determine, according to the channel state information about the first transmitting end device respectively on the M sub-carriers, and based on a principle of coherence bandwidth, the channel state information about the first transmitting end device respectively on the N sub-carriers.

Specifically, channel state information about the first transmitting end device respectively on a plurality of sub-carriers within the coherence bandwidth may be deemed as approximately equal, and may be obtained via channel state information about the first transmitting end device corresponding to a neighboring sub-carrier on the discrete sub-channel (for instance, equal to the channel state information corresponding to the neighboring sub-carrier); or, may be obtained by interpolation (such as linear interpolation) of channel state information about the first transmitting end device respectively corresponding to two non-consecutive sub-carriers adjacent on a same discrete sub-channel, and it should be understood that, an embodiment of the present invention will not be limited thereto. Reference may be made to the above descriptions for a specific embodiment, which will not be repeated herein.

According to the above solution, in a case where an interval between center frequency points of two adjacent sub-carriers in a plurality of non-consecutive sub-carriers on a discrete sub-channel is less than or equal to coherence bandwidth, the receiving end device may acquire full band channel state information about the first transmitting end device based on a principle of coherence bandwidth, and similarly, the receiving end device may also acquire full band channel state information about other transmitting end devices. In this way, the receiving end device selects a transmission sub-channel used for data transmission for the transmitting end device based on the full band channel state information about the transmitting end device, channel resources can be effectively utilized, thereby increasing a throughput rate of the system, and achieving a multi-user selection gain.

Optionally, as another embodiment, the processor 1302 may be specifically configured to: determine values of the channel state information about the first transmitting end device on all transmission sub-channels according to the channel state information about the first transmitting end device respectively on the N sub-carriers, and perform transmission sub-channel allocation according to the values of the channel state information about the first transmitting end device on all transmission sub-channels.

Furthermore, the processor 1302 is specifically configured to: when a value of channel state information about the first transmitting end device on a first transmission sub-channel is a maximum value in the values of the channel state information about the first transmitting end device on all transmission sub-channels, allocate the first transmission sub-channel to the first transmitting end device.

Or, the processor 1302 is specifically configured to: when a value of channel state information about the first transmitting end device on a second transmission sub-channel is less than a value of channel state information about a second transmitting end device on the second transmission sub-channel, allocate the second transmission sub-channel to the second transmitting end device. Furthermore, the processor 1302 may also be configured to: after a certain period of time, allocate the second transmission sub-channel to the first transmitting end device.

The receiving end device 1300 may also include a transmitter 1303, and the transmitter 1303 is configured to transmit a scheduling frame to the first transmitting end device, where the scheduling frame includes allocation of a transmission sub-channel, so that the first transmitting end device transmits data on a corresponding transmission sub-channel according to the scheduling frame.

It should be noted that, the embodiment of the present invention will not make a limitation to a design approach for transmission sub-channels either, the transmission sub-channel may include a plurality of consecutive sub-carriers, may also include a plurality of non-consecutive sub-carriers, and may also include only one sub-carrier. Optionally, a value of channel state information about a transmitting end device on a certain transmission sub-channel may be an average value of channel state information about the transmitting end device on all sub-carriers of the transmission sub-channel.

It should be understood that, the embodiment of the present invention will not make a limitation to how a receiving end device performs transmission sub-channel allocation according to channel state information.

It should be noted that, after a receiving end device receives a contention request frame transmitted by a transmitting end device, the receiving end device may transmit a scheduling frame to the transmitting end device multiple times, as described in the above example, the receiving end device first allocates a transmission sub-channel to a second transmitting end device and transmits the scheduling frame to a plurality of transmitting end devices in a form of broadcasting, and after a certain period of time, allocates the transmission sub-channel to a first transmitting end device, and then transmits the scheduling frame to a plurality of transmitting end devices in a form of broadcasting. The embodiment of the present invention will not limit the times the receiving end device transmits the scheduling frame.

It should also be noted that, when a plurality of transmitting end devices transmit contention request frames on a same discrete sub-channel, since the discrete sub-channel only allows one transmitting end device to transmit a contention request frame, there may be a case where the contention request frame fails to be transmitted on the transmitting end device, the transmitting end device may transmit the contention request frame multiple times. The embodiment of the present invention will not limit the times the transmitting end device transmits the contention request frame.

Figure 14:
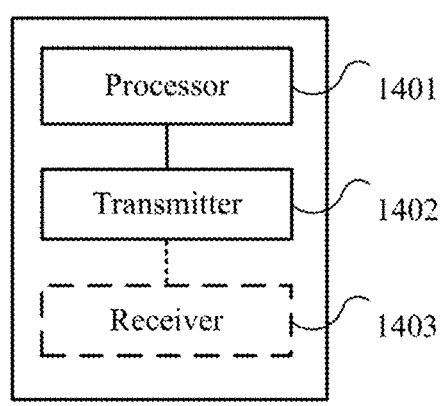
FIG. 14 is a schematic structural diagram of a transmitting end device according to another embodiment of the present invention.

FIG. 14 is a schematic structural diagram of a transmitting end device according to another embodiment of the present invention. The transmitting end device 1400 in FIG. 14 includes a processor 1401 and a transmitter 1402.

The processor 1401 is configured to modulate a contention request frame onto M sub-carriers, where the M sub-carriers at least have two non-consecutive sub-carriers.

The transmitter 1402 is configured to transmit the contention request frame modulated by the processor 1401 to a receiving end device on the M sub-carriers, so that the receiving end device acquires channel state information about the first transmitting end device respectively on the M sub-carriers according to the contention request frame, determines, according to the channel state information about the first transmitting end device respectively on the M sub-carriers, channel state information about the first transmitting end device respectively on N sub-carriers, where the N sub-carriers are obtained by dividing all or a part of a system available frequency band, the N sub-carriers include the M sub-carriers, both N and M are positive integers, N>M and M>1, and performs transmission sub-channel allocation according to the channel state information about the first transmitting end device respectively on the N sub-carriers.

In an embodiment of the present invention, a first transmitting end device modulates a contention request frame onto M sub-carriers, and transmits the contention request frame to a receiving end device on the M sub-carriers, where the M sub-carriers at least have two non-consecutive sub-carriers. Thus, the receiving end device acquires channel state information about the first transmitting end device respectively on a plurality of sub-carriers through the contention request frame modulated by the first transmitting end device onto the M sub-carriers so as to determine channel state information about the first transmitting end device on N sub-carriers obtained by dividing all or a part of a system available frequency band and perform transmission sub-channel allocation. The N sub-carriers include the M sub-carriers, both N and M are positive integers, N>M and M>1. Thus, the embodiment of the present invention enables the receiving end device to acquire full band channel state information by using a plurality of non-consecutive sub-carriers, and effectively utilize channel resources when performing transmission sub-channel allocation, thereby increasing a throughput rate of the system, and achieving a multi-user selection gain.

It should be noted that, the full band herein indicates all or a part of a system available frequency band, that is, the full band is divided into the N sub-carriers described above, and it should be understood that, the embodiment of the present invention will not limit bandwidth size of the full band.

In the embodiment of the present invention, the sub-channel formed by the above M sub-carriers is called as a discrete sub-channel, the N sub-carriers may be divided into one or more discrete sub-channels, the number of sub-carriers included in different discrete sub-channels may be the same or different, and different transmitting end devices may transmit contention request frames on different discrete sub-channels.

The transmitting end device 1400 may perform each step related to the transmitting end device in the method as shown in FIG. 1 to FIG. 8, and to avoid redundancy, it will not be repeated herein.

Optionally, as an embodiment, a spacing between center frequency points of two adjacent sub-carriers in the M sub-carriers may be less than or equal to coherence bandwidth. Reference may be made to the above descriptions for a specific embodiment, which will not be repeated herein.

Thus, in a case where an interval between center frequency points of two sub-carriers adjacent in a plurality of non-consecutive sub-carriers on a discrete sub-channel is less than or equal to coherence bandwidth, the receiving end device may acquire full band channel state information about the first transmitting end device based on a principle of coherence bandwidth. In this way, the receiving end device selects a transmission sub-channel used for data transmission for the transmitting end device based on the full band channel state information about the transmitting end device, channel resources can be effectively utilized, thereby increasing a throughput rate of the system, and achieving a multi-user selection gain.

Optionally, design information about the above discrete sub-channel may be pre-agreed by a receiving end device and a transmitting end device, and design of the discrete sub-channel may also be performed by a network side device (such as the above receiving end device), the design information about the discrete sub-channel is transmitted to a plurality of transmitting end devices in a form of broadcasting, and the first transmitting end device is any one of the plurality of the transmitting end devices. It should be understood that, the embodiment of the present invention will not make a limitation. The first transmitting end device may select a discrete sub-channel from a plurality of discrete sub-channels according to the design information about the discrete sub-channel to transmit the contention request frame.

Optionally, the channel state information may include at least one of: a channel matrix H, an SINR, an SNR, a CQI, etc., it should be understood that, the embodiment of the present invention will not be limited thereto.

Optionally, as an embodiment, the transmitting end device 1400 may also include a receiver 1403, and the receiver 1403 is configured to receive a scheduling frame transmitted by the receiving end device, where the scheduling frame includes allocation of a transmission sub-channel. The transmitter 1402 may also be configured to: transmit data on a corresponding transmission sub-channel according to the scheduling frame received by the receiver 1403.

It should be noted that, after a receiving end device receives a contention request frame transmitted by a transmitting end device, the receiving end device may transmit a scheduling frame to the transmitting end device multiple times. The embodiment of the present invention will not limit the times the receiving end device transmits the scheduling frame.

It should also be noted that, when a plurality of transmitting end devices transmit contention request frames on a same discrete sub-channel, since the discrete sub-channel only allows one transmitting end device to transmit a contention request frame, there may be a case where the contention request frame fails to be transmitted on the transmitting end device, the transmitting end device may transmit the contention request frame multiple times. The embodiment of the present invention will not limit the times the transmitting end device transmits the contention request frame.

It may be known by persons skilled in the art that, units and algorithm steps of each example that are described with reference to the embodiments disclosed herein may be implemented by electronic hardware, or a combination of electronic hardware and computer software. The situation that these functions are performed by hardware or software depends on a specific application and a design constraint of technical solutions. Persons skilled in the art may implement the described functions by using different methods for each specific application, and such implementation should not be conceived as going beyond the scope of the present invention.

It may be clearly understood by a person skilled in the art that, for the purpose of convenient and brief description, reference may be made to corresponding process in the foregoing method embodiments for a detailed working process of the foregoing system, device and unit, which will not be repeated herein.

In several embodiments provided in the present application, it should be understood that the disclosed system, device, and method may be implemented in other manners. For example, the described device embodiment is merely exemplary. For example, division of the unit is merely division of logical functions and there may be other division approaches during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between devices or units may be implemented electronically, or mechanically, or in other forms.

The units described as separate parts may or may not be physically separate, and parts displayed as units may or may not be physical units, that is, may be located in one position, or may be distributed on a plurality of network units. A part or all of the units may be selected according to actual needs to achieve objectives of solutions of the embodiments.

In addition, functional units in the embodiments of the present invention may be integrated into one processing unit, or each of the units may exist alone physically, or two or more units may be integrated into one unit.

If the functions are implemented in a form of a software functional unit and sold or used as an independent product, they may be stored in a computer-readable storage medium. Based on such understanding, the technical solutions of the present invention essentially, or the part contributing to the prior art, or all or a part of the technical solutions may be implemented in a form of a software product. The computer software product is stored in a storage medium, and includes several instructions for enabling a computer device (which may be a personal computer, a server, or a network device) to perform all or a part of steps of the methods described in the embodiments of the present invention. The foregoing storage medium includes: any medium capable of storing program codes, such as a USB flash disk, a mobile hard disk, a read-only memory (ROM, Read-Only Memory), a random access memory (RAM, Random Access Memory), a magnetic disk, or an optical disc.

The above descriptions are merely specific embodiments of the present invention; however, the protection scope of the present invention is not limited thereto. Any modification or replacement that may be readily envisaged of by persons skilled in the art within the technical scope disclosed in the present invention should fall into the protection scope of the present invention. Thus, the protection scope of the present invention shall be subject to the claims.

What is claimed is:

1. A method for accessing a channel, comprising:
receiving, by a receiving end device, a contention request frame transmitted by a first transmitting end device on M sub-carriers, wherein the M sub-carriers have at least two non-consecutive sub-carriers, and the contention request frame is modulated by the first transmitting end device onto the M sub-carriers;
acquiring, by the receiving end device, according to the contention request frame, channel state information about the first transmitting end device respectively on the M sub-carriers;
determining, by the receiving end device, according to the channel state information about the first transmitting end device respectively on the M sub-carriers, channel state information about the first transmitting end device respectively on N sub-carriers, wherein the N sub-carriers are obtained by dividing all or a part of a system available frequency band, the N sub-carriers comprise the M sub-carriers, wherein both N and M are positive integers, and wherein N is greater than M and M is greater than 1; and
performing, by the receiving end device, allocation of a transmission sub-channel according to the channel state information about the first transmitting end device respectively on the N sub-carriers.

2. The method according to claim 1, wherein a spacing between center frequency points of two adjacent sub-carriers in the M sub-carriers is less than or equal to a coherence bandwidth.

3. The method according to claim 2, wherein the determining, by the receiving end device, according to the channel state information about the first transmitting end device respectively on the M sub-carriers, channel state information about the first transmitting end device respectively on N sub-carriers comprises:
determining, by the receiving end device, according to the channel state information, about the first transmitting end device respectively on the M sub-carriers and based on a principle of the coherence bandwidth, the channel state information about the first transmitting end device respectively on the N sub-carriers.

4. The method according to claim 1, wherein the performing, by the receiving end device, allocation of a transmission sub-channel according to the channel state information about the first transmitting end device respectively on the N sub-carriers comprises:
determining, by the receiving end device, values of channel state information about the first transmitting end device on all transmission sub-channels according to the channel state information about the first transmitting end device respectively on the N sub-carriers; and
performing, by the receiving end device, the allocation of the transmission sub-channel according to the values of the channel state information about the first transmitting end device on all transmission sub-channels.

5. The method according to claim 4, wherein the performing, by the receiving end device, the allocation of the transmission sub-channel according to the values of the channel state information about the first transmitting end device on all transmission sub-channels comprises:
when a value of channel state information about the first transmitting end device on a first transmission sub-channel is a maximum value in the values of the channel state information about the first transmitting end device on all transmission sub-channels, allocating, by the receiving end device, the first transmission sub-channel to the first transmitting end device; or
when a value of channel state information about the first transmitting end device on a second transmission sub-channel is less than a value of channel state information about a second transmitting end device on the second transmission sub-channel, allocating, by the receiving end device, the second transmission sub-channel to the second transmitting end device.

6. The method according to claim 1, wherein the channel state information comprises at least one of: a channel matrix H, a signal to interference plus noise ratio SINR, a signal to noise ratio SNR, and a channel quality indicator CQI.

7. The method according to claim 1, wherein the method further comprises:
transmitting, by the receiving end device, a scheduling frame to the first transmitting end device, wherein the scheduling frame comprises the allocation of the transmission sub-channel, to enable the first transmitting end device to transmit data on a corresponding transmission sub-channel according to the scheduling frame.

8. A method for accessing a channel, comprising:
modulating, by a first transmitting end device, a contention request frame onto M sub-carriers, wherein the M sub-carriers have at least two non-consecutive sub-carriers;
transmitting, by the first transmitting end device, the contention request frame to a receiving end device on the M sub-carriers, to enable the receiving end device to acquire channel state information about the first transmitting end device respectively on the M sub-carriers according to the contention request frame, to determine, according to the channel state information about the first transmitting end device respectively on the M sub-carriers, channel state information about the first transmitting end device respectively on N sub-carriers, wherein the N sub-carriers are obtained by dividing all or a part of a system available frequency band, wherein the N sub-carriers comprise the M sub-carriers, wherein both N and M are positive integers, and wherein N is greater than M and M is greater than 1, and to perform allocation of a transmission sub-channel according to the channel state information about the first transmitting end device respectively on the N sub-carriers.

9. The method according to claim 8, wherein a spacing between center frequency points of two adjacent sub-carriers in the M sub-carriers is less than or equal to a coherence bandwidth.

10. The method according to claim 8, wherein the channel state information comprises at least one of: a channel matrix H, a signal to interference plus noise ratio SINR, a signal to noise ratio SNR, and a channel quality indicator CQI.

11. The method according to claim 8, wherein the method further comprises:
receiving, by the first transmitting end device, a scheduling frame transmitted by the receiving end device, wherein the scheduling frame comprises the allocation of the transmission sub-channel; and
transmitting, by the first transmitting end device, data on a corresponding transmission sub-channel according to the scheduling frame.

12. A receiving end device, comprising:
a first receiver, configured to receive a contention request frame transmitted by a first transmitting end device on M sub-carriers, wherein the M sub-carriers have at least two non-consecutive sub-carriers, and the contention request frame is modulated by the first transmitting end device onto the M sub-carriers;

a first processor, configured to acquire, according to the contention request frame received by the first receiver, channel state information about the first transmitting end device respectively on the M sub-carriers, and configured to determine, according to the channel state information about the first transmitting end device respectively on the M sub-carriers acquired by the acquiring unit, channel state information about the first transmitting end device respectively on N sub-carriers, wherein the N sub-carriers are obtained by dividing all or a part of a system available frequency band, wherein the N sub-carriers comprise the M sub-carriers, wherein both N and M are positive integers, and wherein N is greater than M and M is greater than 1, and configured to perform allocation of a transmission sub-channel according to the channel state information about the first transmitting end device respectively on the N sub-carriers.

13. The receiving end device according to claim 12, wherein a spacing between center frequency points of two adjacent sub-carriers in the M sub-carriers is less than or equal to a coherence bandwidth.

14. The receiving end device according to claim 13, wherein
the first processor is configured to determine, according to the channel state information about the first transmitting end device respectively on the M sub-carriers, and based on a principle of coherence bandwidth, the channel state information about the first transmitting end device respectively on the N sub-carriers.

15. The receiving end device according to claim 12, wherein
the first processor is further configured to determine values of the channel state information about the first transmitting end device on all transmission sub-channels according to the channel state information about the first transmitting end device respectively on the N sub-carriers; and
the first processor is configured to perform the allocation of the transmission sub-channel according to the values of the channel state information about the first transmitting end device on all transmission sub-channels.

16. The receiving end device according to claim 15, wherein
the first processor is configured to, when a value of channel state information about the first transmitting end device on a first transmission sub-channel is a maximum value in the values of the channel state information about the first transmitting end device on all transmission sub-channels, allocate, by the receiving end device, the first transmission sub-channel to the first transmitting end device; or
the first processor is configured to, when a value of channel state information about the first transmitting end device on a second transmission sub-channel is less than a value of channel state information about a second transmitting end device on the second transmission sub-channel, allocate, by the receiving end device, the second transmission sub-channel to the second transmitting end device.

17. The receiving end device according to claim 12, wherein the receiving end device further comprises a first transmitter, and
the first transmitter is configured to transmit a scheduling frame to the first transmitting end device, wherein the scheduling frame comprises the allocation of the transmission sub-channel, to enable the first transmitting end device to transmit data on a corresponding transmission sub-channel according to the scheduling frame.

18. A transmitting end device, comprising:
a first processor, configured to modulate a contention request frame onto M sub-carriers, wherein the M sub-carriers have at least two non-consecutive sub-carriers;
a first transmitter, configured to transmit the contention request frame modulated by the second processor to a receiving end device on the M sub-carriers, to enable the receiving end device to acquire channel state information about the first transmitting end device respectively on the M sub-carriers according to the contention request frame, to determine, according to the channel state information about the first transmitting end device respectively on the M sub-carriers, channel state information about the first transmitting end device respectively on N sub-carriers, wherein the N sub-carriers are obtained by dividing all or a part of a system available frequency band, wherein the N sub-carriers comprise the M sub-carriers, wherein both N and M are positive integers, and wherein N is greater than M and M is greater than 1, and to perform allocation of a transmission sub-channel according to the channel state information about the first transmitting end device respectively on the N sub-carriers.

19. The transmitting end device according to claim 18, wherein a spacing between center frequency points of two adjacent sub-carriers in the M sub-carriers is less than or equal to coherence bandwidth.

20. The transmitting end device according to claim 18, wherein the transmitting end device further comprises a first receiver,
the first receiver is configured to receive a scheduling frame transmitted by the receiving end device, wherein the scheduling frame comprises the allocation of the transmission sub-channel; and
the first transmitter is further configured to transmit data on a corresponding transmission sub-channel according to the scheduling frame received by the first receiver.

* * * * *